March 21, 1950 N. D. PRESTON ET AL 2,501,091

STATION SELECTIVE RADIO COMMUNICATION SYSTEM

Filed June 26, 1946 10 Sheets-Sheet 1

INVENTORS
N.D.Preston and F.B.Hitchcock
BY Neil D. Preston,
THEIR ATTORNEY.

March 21, 1950 N. D. PRESTON ET AL 2,501,091

STATION SELECTIVE RADIO COMMUNICATION SYSTEM

Filed June 26, 1946 10 Sheets-Sheet 2

INVENTORS
N.D. Preston and F.B. Hitchcock
BY Neil D. Preston,
THEIR ATTORNEY.

TYPICAL RADIO FREQUENCY CHANNEL CONDITIONS
(FIGS. 1 AND 2)

Office Calls All Train Stations

Office Calls Particular Train Station

Two-Way Communication with Selected Station

Train Station Calls Office

Train Station Calls All Stations

INVENTORS
N.D. Preston and F.B. Hitchcock
BY Neil D. Preston,
THEIR ATTORNEY.

OFFICE CALLS PARTICULAR TRAIN STATION (FIGS. 1 AND 2)

INVENTORS
N.D.Preston and F.B.Hitchcock
BY Neil D. Preston,
THEIR ATTORNEY.

March 21, 1950 N. D. PRESTON ET AL 2,501,091

STATION SELECTIVE RADIO COMMUNICATION SYSTEM

Filed June 26, 1946 10 Sheets-Sheet 5

INVENTORS
N.D.Preston and F.B.Hitchcock
BY Neil D. Preston,
THEIR ATTORNEY.

March 21, 1950 N. D. PRESTON ET AL 2,501,091

STATION SELECTIVE RADIO COMMUNICATION SYSTEM

Filed June 26, 1946 10 Sheets-Sheet 6

INVENTORS
N.D.Preston and F.B.Hitchcock
BY *Neil D. Preston*,
THEIR ATTORNEY.

STATION SELECTIVE RADIO COMMUNICATION SYSTEM

Filed June 26, 1946 10 Sheets-Sheet 7

INVENTORS
N.D.Preston and F.B.Hitchcock
BY Neil D. Preston,
THEIR ATTORNEY.

FIG. 9A. OFFICE CALLS PARTICULAR TRAIN STATION (FIGS. 3 AND 4)
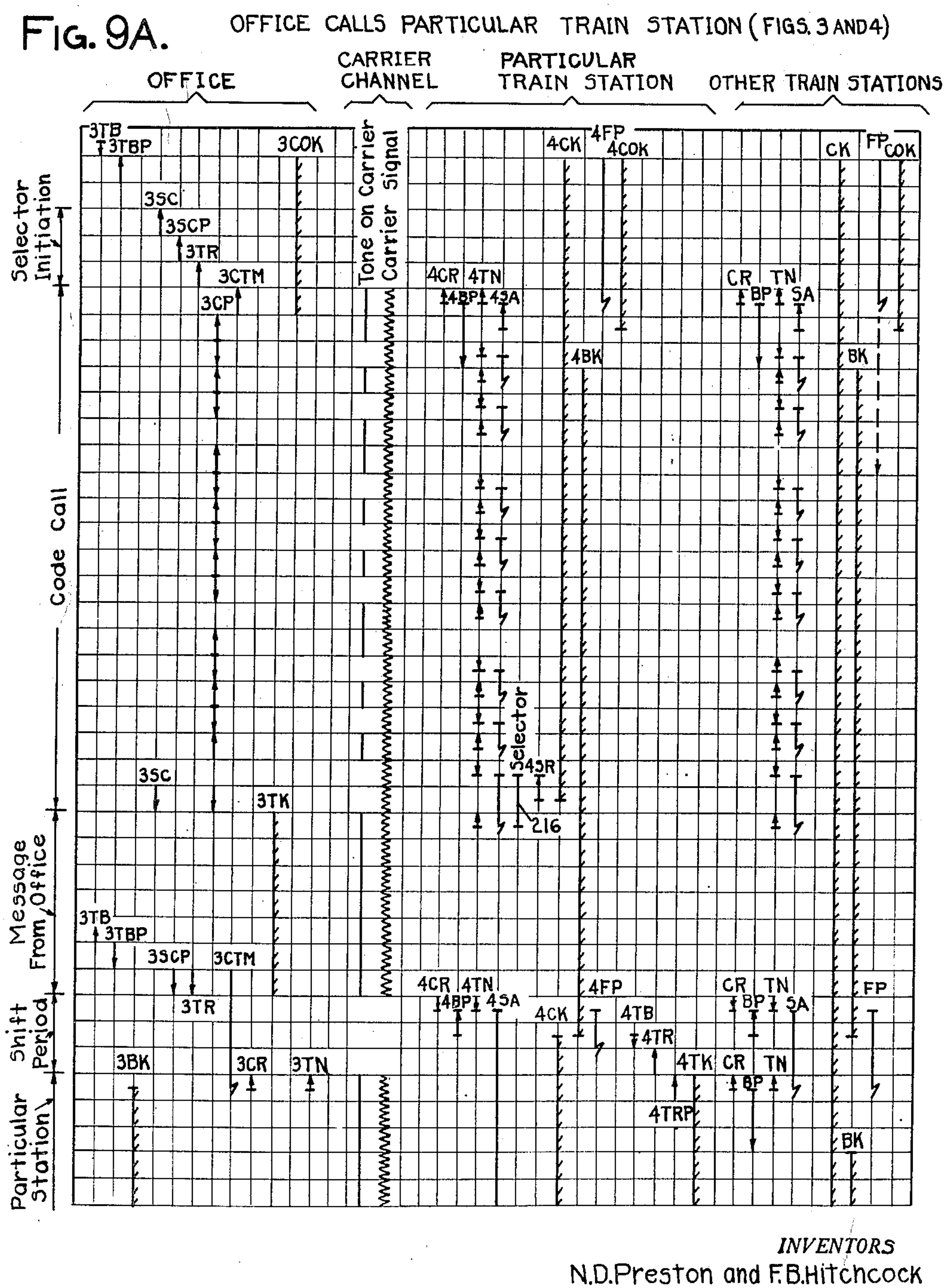
INVENTORS
N.D.Preston and F.B.Hitchcock
BY Neil D. Preston
THEIR ATTORNEY.

March 21, 1950 N. D. PRESTON ET AL 2,501,091

STATION SELECTIVE RADIO COMMUNICATION SYSTEM

Filed June 26, 1946 10 Sheets-Sheet 10

TYPICAL TRAIN STATION CALLS OFFICE (FIGS 3AND 4)

INVENTORS
N.D.Preston and F.B.Hitchcock
BY Neil W. Preston,
THEIR ATTORNEY.

March 21, 1950 N. D. PRESTON ET AL 2,501,091

STATION SELECTIVE RADIO COMMUNICATION SYSTEM

Filed June 26, 1946 10 Sheets-Sheet 9

INVENTORS
N.D.Preston and F.B.Hitchcock
BY Neil D. Preston,
THEIR ATTORNEY.

Patented Mar. 21, 1950

2,501,091

UNITED STATES PATENT OFFICE 2,501,091

STATION SELECTIVE RADIO COMMUNICATION SYSTEM

Neil D. Preston and Forest B. Hitchcock, Rochester, N. Y., assignors to General Railway Signal Company, Rochester, N. Y.

Application June 26, 1946, Serial No. 679,350

29 Claims. (Cl. 250—6)

This invention relates to communication systems for transmitting intelligence verbally or otherwise by modulation of a carrier frequency, and more particularly pertains to such a system adapted for use in connection with communication with and between mobile units.

The present invention contemplates that messages or instructions may be communicated to and from mobile units such as trains, or the like, by modulation of a carrier frequency in accordance with a voice message or other intelligence which carrier frequency may be employed in connection with space radiation, as in the usual radio communication system, or by induction into line wires, track rails or conductors along the line of movement of the mobile units in a manner commonly referred to as a wired radio or carrier current system. It is further contemplated that the system of the present invention will be just as effective for providing communication between two or more mobile units.

In connection with the communication system of the present invention, it is assumed that all communication between stations regardless of their location, is to be over the same carrier frequency channel. Although the communication system of the present invention may be used in various ways for the transmission of information between a central office and different kinds of mobile units, it is believed to be particularly adaptable for use in connection with terminal areas on railroads, or in other situations on railroads, where it is desirable to communicate between a central office and a plurality of train stations as well as in certain cases to provide communication between the train stations themselves. More specifically, in a railroad terminal area there is usually a large number of switch engine movements performed under the direction of a yard master; and these switching movements are usually independent of the train orders given to the trains by the dispatcher for train movements through a division on the main line tracks. Also, the directions given to the switching engines usually contain information specifically for a particular switching engine, thus making it unnecessary and in some cases undesirable for each switching engine or train station to hear the instructions given to all other train stations. For this reason, one of the purposes of the present invention is to provide selective talking between a central office and any desired one of a plurality of train stations with means for communicating with all of the train stations when desired or in the event of a failure of the selecting apparatus.

A further purpose of the present invention is to so organize the system that an operator at the central office may, by operation of a distinctive calling key or the like, effect selective communication with a particular train station which train station can maintain its selected condition for answering back to the central office in the two-way communication organization without an additional selecting operation and without any of the other train stations hearing such reply message. In other words, once the selective communication is established, it can be maintained for two-way communication without further selective operations.

A further feature of the present invention is that any train station may selectively call the central office and communicate therewith without being heard by any of the other train stations, and at the same time prevent any of the other train stations from breaking in upon the communication channel thus selectively established.

It is also contemplated in one form of the invention that the availability of the communication channel between the central office and the plurality of train stations will be continuously checked even while not in use for voice communication, and in this way advise the operator at any train station when communication between the central office and his station has failed. Such a checking indication provides the operator of a train station with such information that in the event of failure, he can control his train accordingly and only do those things which are on the side of safety. In a terminal area, the lack of such a feature might cause time delays and the like where a train would be awaiting instructions not knowing that communication from the central office had failed; whereas, with the present invention the indication of a failure would advise the operator to get into contact with the central office either personally or over some other communication facility so as to avoid undue delays in the reception of his instructions.

A further feature of the present invention provides that the system of communication shall be adapted for the transmission of facsimile messages, so that each train station may have a facsimile recorder to make a record of the instructions transmitted to that particular train station from the central office.

Although the present invention is considered to be particularly useful in connection with terminal areas on railroads, it may also be used in connection with wayside traffic on the main tracks of a railroad, in hump yards, or the like.

Also, since the embodiment of the present invention is shown more particularly in connection with the usual radio or space radiation type of communication system, it will be readily appreciated that such a system may be applied to ships, airplanes, buses or any type of mobile unit where it is desirable to employ selective communication between the mobile stations and a central office or station.

These characteristic features of the present invention will be explained more in detail in the further description of the embodiment of the invention; and various other characteristic features, functions, and attributes of a system embodying this invention will be in part pointed out and in part apparent as the description thereof progresses.

In describing the invention in detail, reference will be made to the accompanying drawings in which like letter reference characters designate similar parts throughout the several views, and in which.

Figure 2:
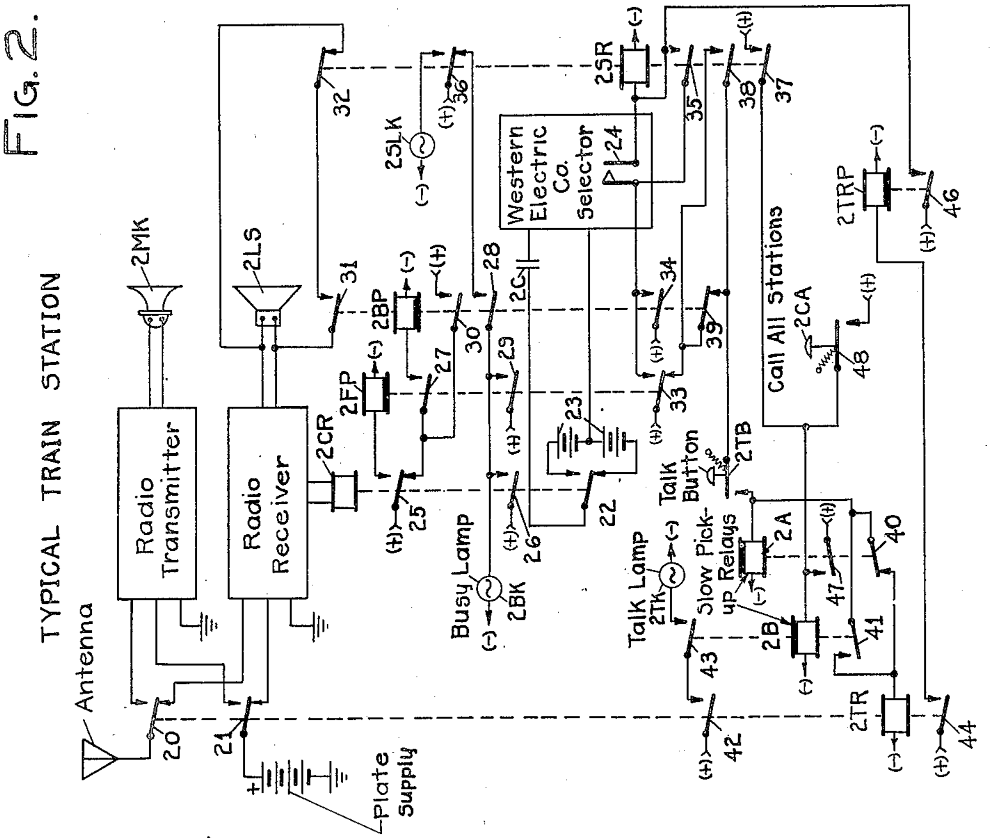
Fig. 2 represents a typical mobile station unit arranged to provide two-way communication between that station and the central office station of Fig. 1 and one or more other similar mobile stations on the same radio carrier frequency channel, and adapted to provide the selective characteristics above generally described.
Figure 1:
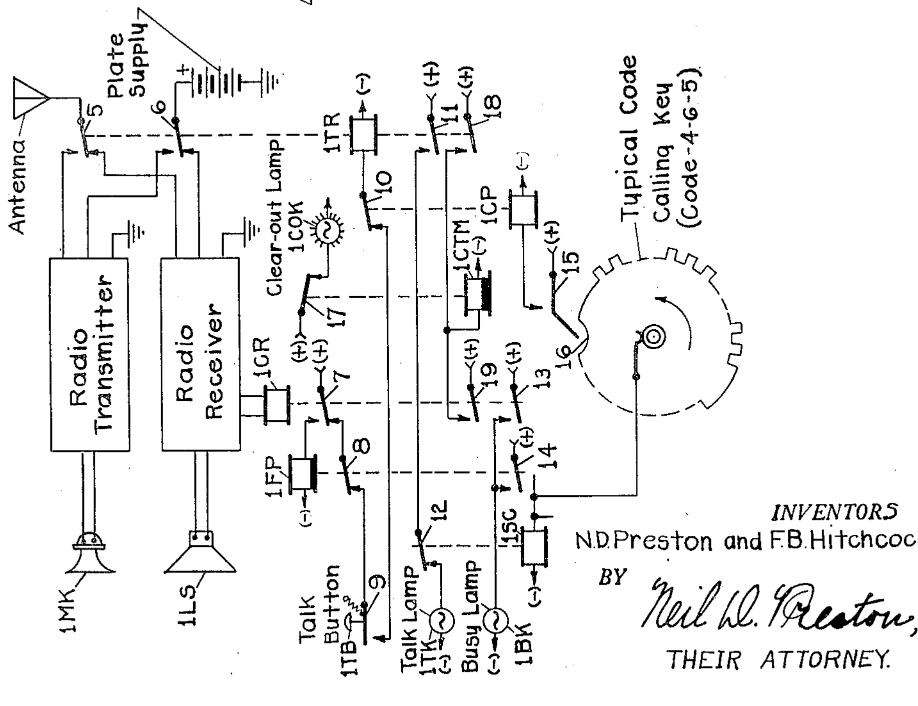
Fig. 1 represents a typical central office or station arranged to provide selective two-way communication between that station and one or more mobile stations on the same carrier frequency channel.
Figures 3, 4:
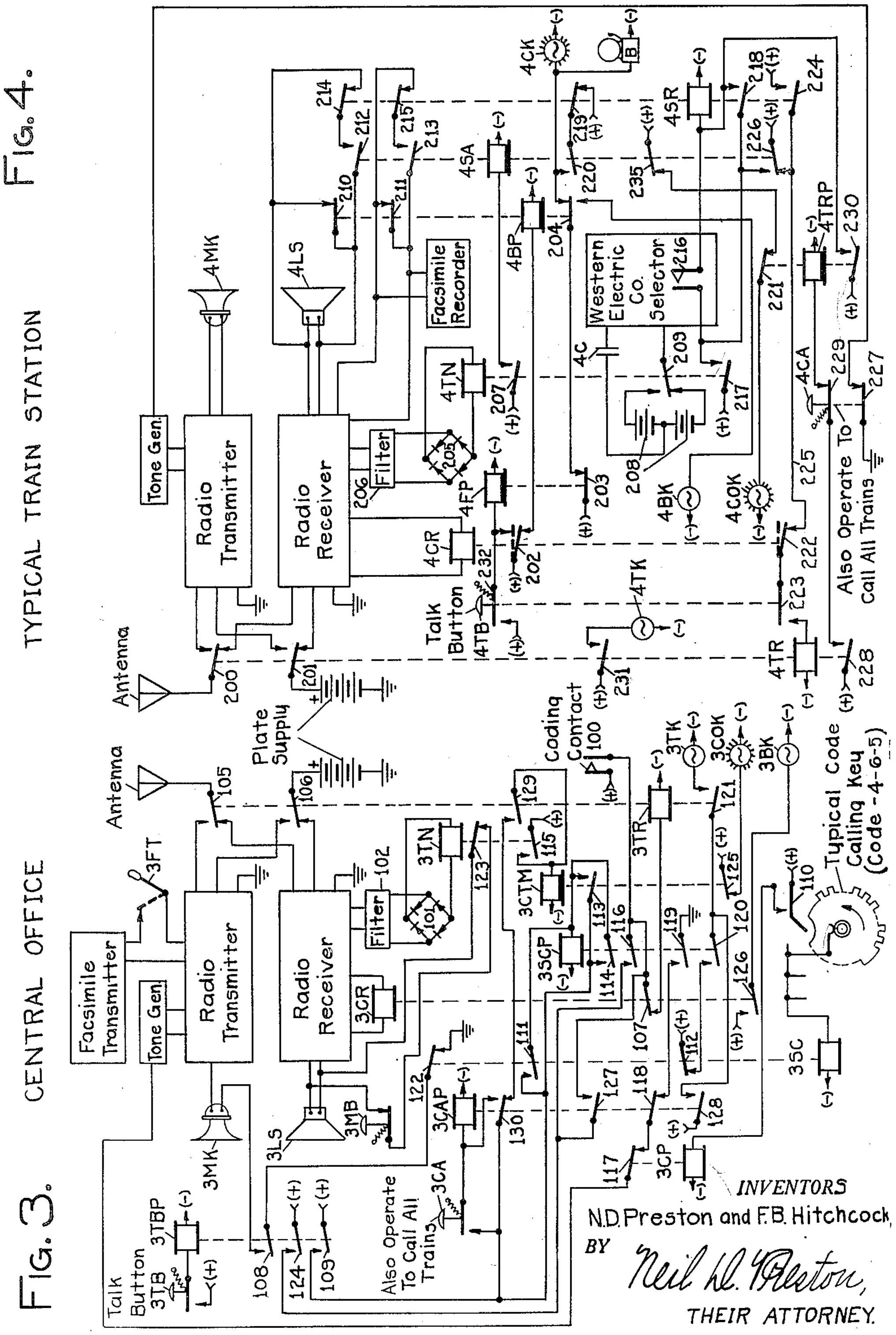
Fig. 3 represents a modified form of a typical central station arranged to provide selective two-way communication between that station and one or more mobile stations on the same radio carrier frequency channel which central office apparatus is adapted to provide for the checking features above generally described as well as the feature of facsimile transmission.
Figure 6A:
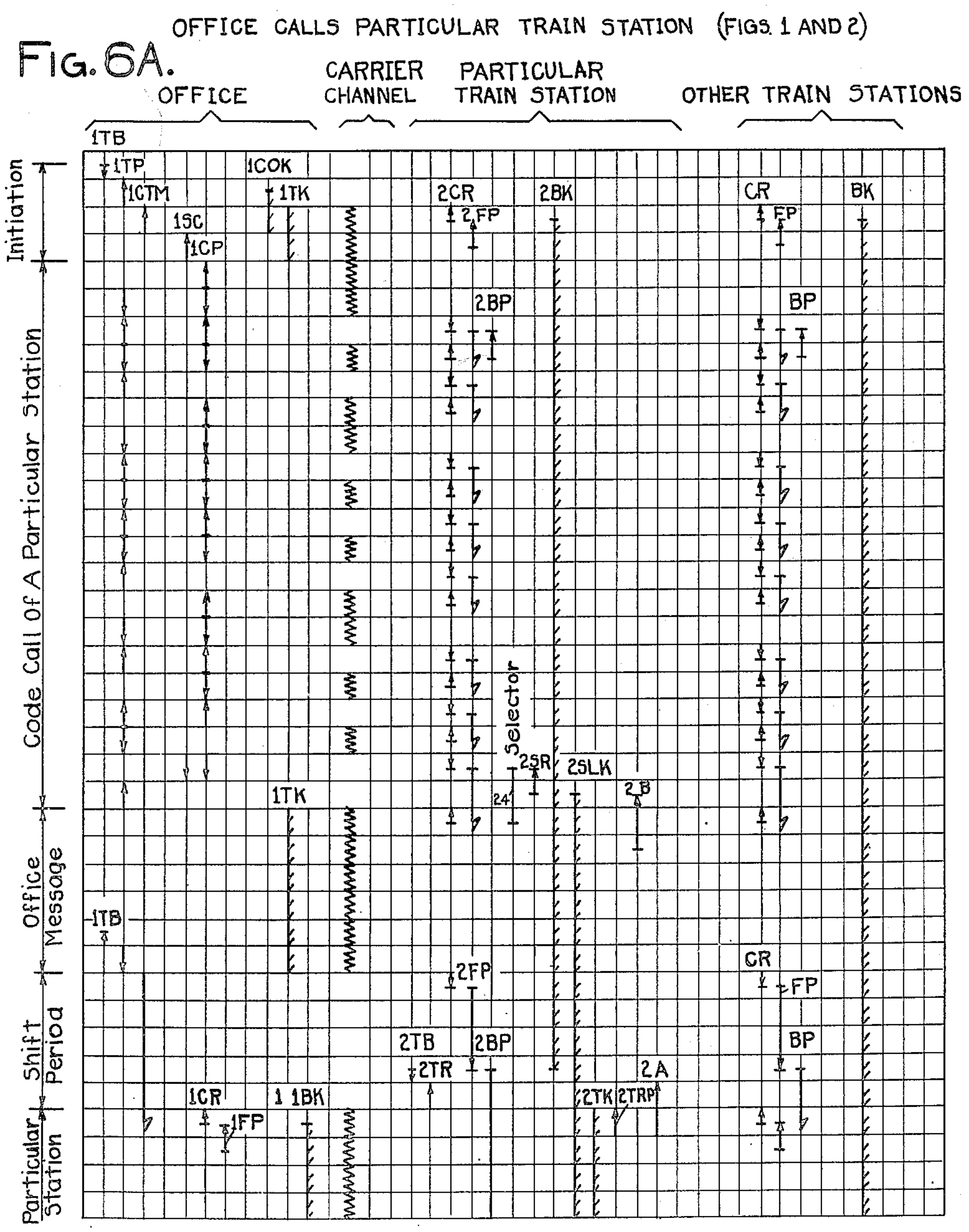
Figure 6B:
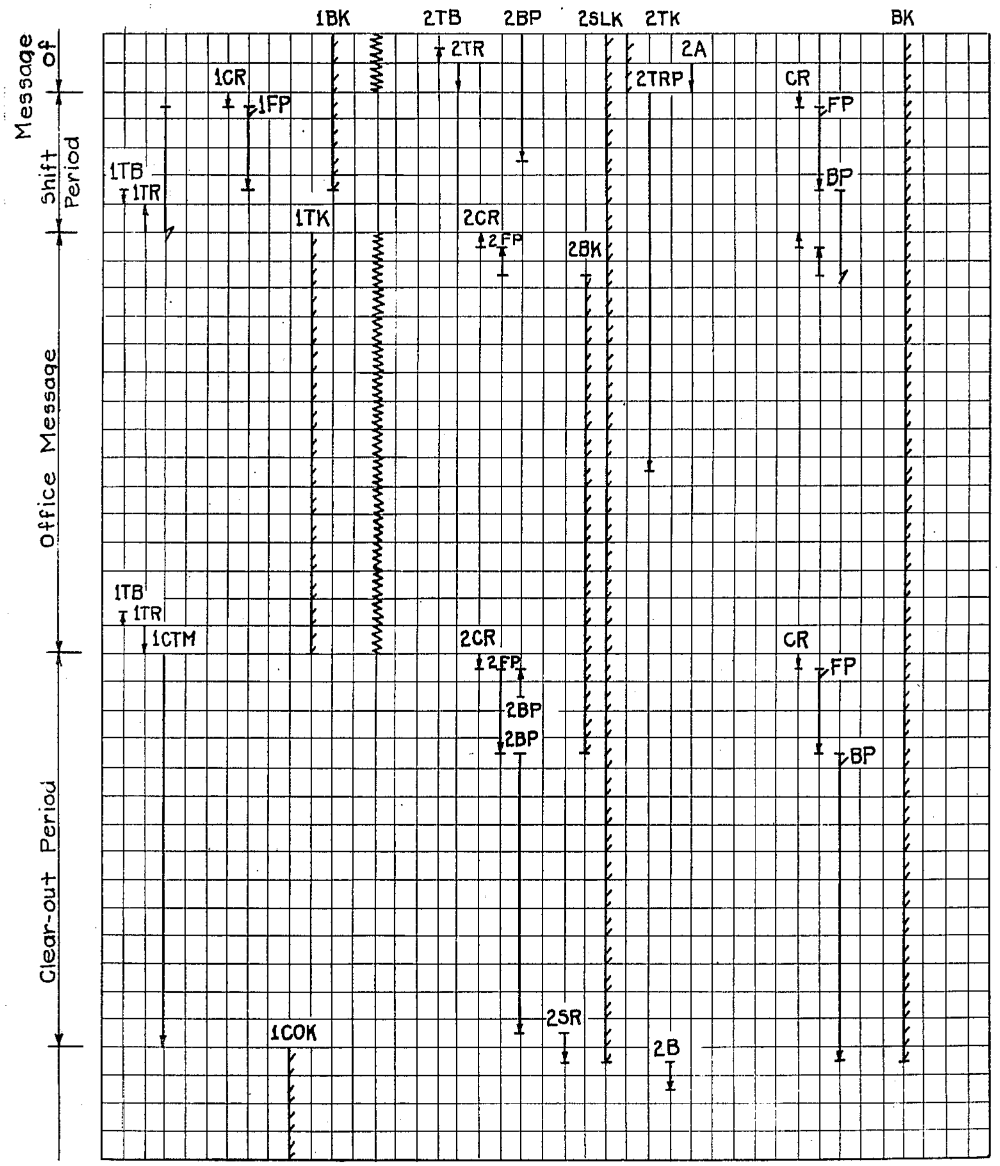
Figure 7:
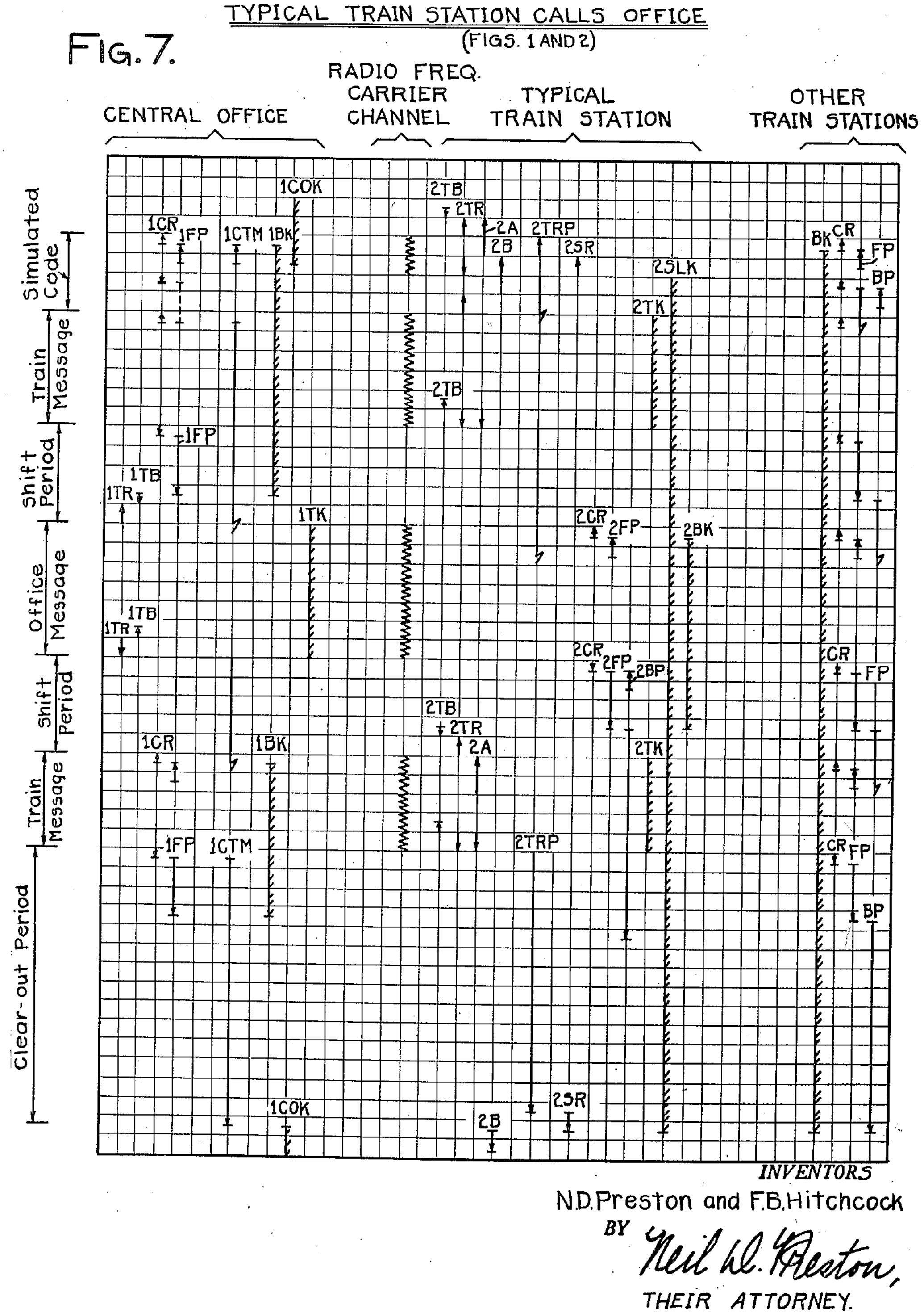
Figure 10:
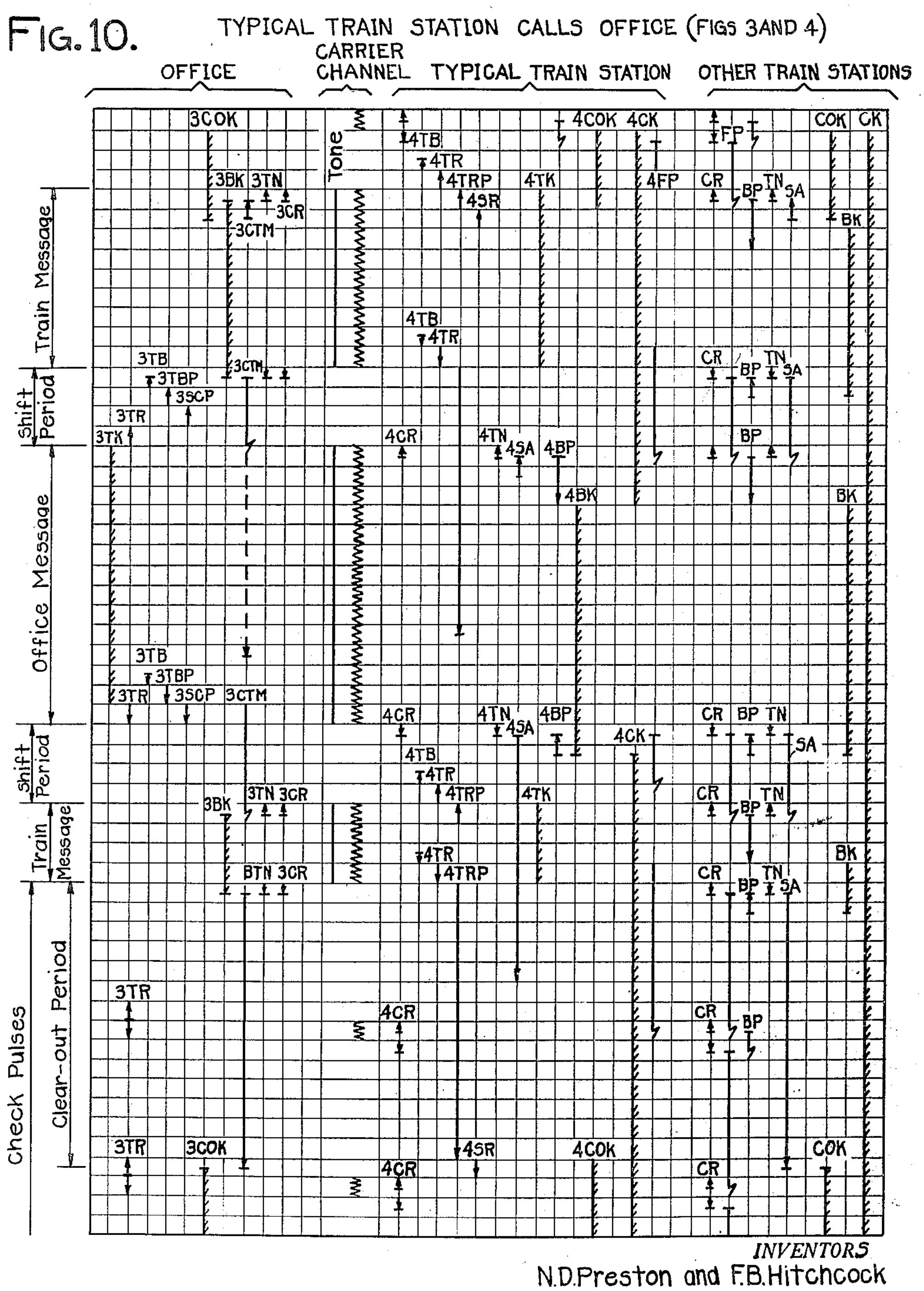
Figure 9B:
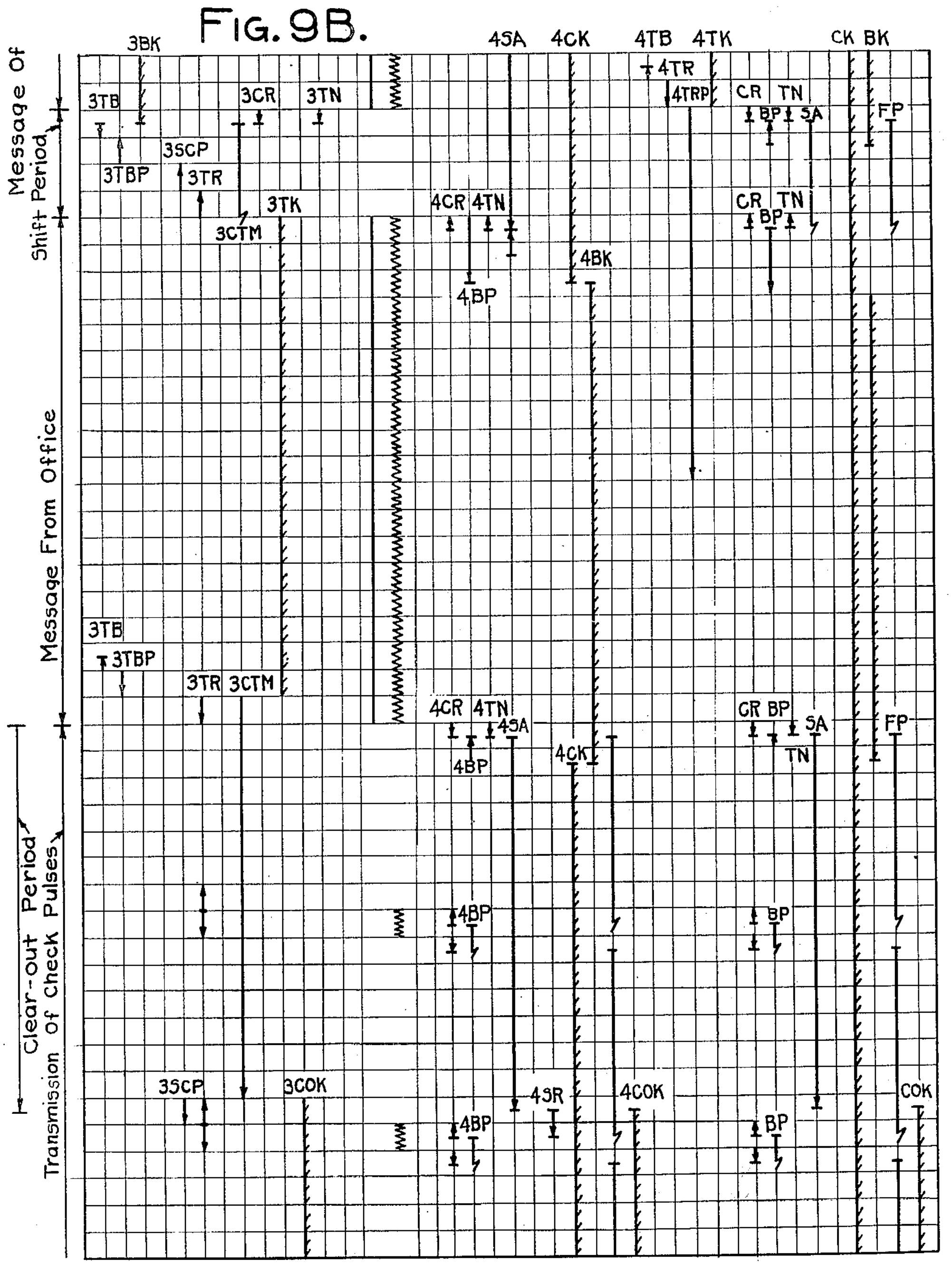

Fig. 4 represents a modified form of a typical mobile station unit arranged to provide two-way communication between that station and the central office station of Fig. 3 and one or more of the other similar mobile stations on the same radio carrier frequency channel, and adapted to provide the selective characteristics above generally described together with the checking features and the facility of a facsimile recorder;

Figs. 5A, 5B, 5C, 5D and 5E, indicate typical radio frequency channel conditions by suitable symbols and legends under various conditions which may be encountered in the operation of the system organization of Figs. 1 and 2;

Figs. 6A and 6B placed end to end form a chart showing one possible arrangement of sequences for the various relay operations when the office of Fig. 1 calls a particular train station, such as shown in Fig. 2;

Fig. 7 is a chart showing one possible arrangement of sequences for the relay operations involved when a typical train station, such as shown in Fig. 2, calls the office of Fig. 1;

Figs. 8A, 8B, 8C, 8D, 8E and 8F indicate typical radio frequency channel conditions by suitable symbols and legends of the system organization illustrated in Figs. 3 and 4 under typical conditions encountered in practice;

Figs. 9A and 9B placed end to end form a chart showing one possible arrangement of sequences for the relay operations involved when the office of Fig. 3 calls a particular train station, such as typically shown in Fig. 4; and Fig. 10 is a chart showing one possible arrangement of sequences for the relay operations involved when a typical train station, such as shown in Fig. 4, calls the office as shown in Fig. 3.

In order to simplify the illustrations in the drawings and facilitate the explanation of the fundamental characteristics of the invention, various parts and circuits have been shown diagrammatically in accordance with conventional symbols. Arrow heads and tails with the associated symbols (+) and (−) are employed to indicate connections of the circuits of the various relays to the opposite terminals of a suitable source of current for the energization of such relays; and the source of current may be of any suitable character for the purpose intended. The various contacts of the relays involved in the illustrations are shown conventionally as being in a lower or inclined position when the coil or winding of the associated relay is deenergized, and in a raised or horizontal position when the relay is energized. The contacts belonging to any given relay are shown connected to its coil or winding by dotted lines, and these contacts may be located either below or above the illustration of the relay winding. The front and back contacts between which the movable contacts are operated by the different relays are shown conventionally as arrow heads, and the movable contacts are ordinarily of the type which have their contacts pulled downwardly by gravity or by spring action.

The specific embodiment of the invention chosen for the purpose of illustration and description comprises a radio telephone communication system of the conventional type employing radio transmitters and radio receivers all constructed to operate on a suitable carrier frequency allocated for the particular use of the stations involved; and in this connection it is contemplated that such frequency channels will ordinarily be in the megacycle band, since it is in such band that channels are now assigned for railroad use. However, it should be understood that the present invention may be employed for other uses, in which case it may be assigned any frequency channel allocated for such use. Insofar as the embodiment of the present invention is concerned, it is immaterial whether frequency modulation or amplitude modulation of the carrier frequency signals is employed. It should be further understood that any suitable carrier frequency may be employed with either form of modulation so long as the selected frequency is substantially higher than the modulating frequencies to be used in practicing the invention.

Since the structure and operation of radio telephone transmitters and receivers are well understood in the art, no attempt has been made to illustrate the various component parts in their entirety and only those parts have been shown which have a direct bearing or relationship to the parts necessary for practicing the present invention. In other words, the transmitters and receivers are assumed to include the various conventional component parts of a radio system such as oscillators, intermediate amplifiers, power amplifiers, modulators, and demodulators as well as squelch tube circuits or any other component parts which may be desirable for the practice of the invention. It is also assumed that the various sources of energy for supplying potential to the plate circuits, biasing grids, and for supplying power to the tube heaters, and the like may be provided in any of the conventional and well known ways. The plate source of supply has been shown in those cases where it is believed expedient to indicate such sources for a better understanding of the invention.

*General organization*

With reference to Fig. 1, a typical central office organization is illustrated, and it is assumed that this central office is strategically located with regard to the terminal area or other area within which the mobile units are to move and still be within communication with the central office. In Fig. 2, a typical train station has been illustrated as being typical of all of the train stations assumed to be within the range of the central office of Fig. 1.

The central office of Fig. 1 and the train stations, as typically shown in Fig. 2, comprises a complete communication organization embodying the present invention and illustrating more particularly the selective feature of the invention, i. e. where the central office may select any one of a plurality of train stations and such selected condition can be maintained for two-way communication between the central office and that station without interruption by any other station.

The system organization illustrated in Figs. 3 and 4 will be described in detail later, but it is desired to point out that these two figures illustrate a modified form of a communication organization including certain characteristic features generally described above as well as certain additional features involving a check upon the continued availability of the communication facilities.

*Central office of Fig. 1.*—The central office is shown as including a conventional radio transmitter with its microphone 1MK, a conventional radio receiver with its loud speaker 1LS, suitable control apparatus including a typical code calling key, and suitable indication lamps.

The radio receiver is normally connected through back contact 5 of the transmit relay 1TR to a suitable antenna, and the radio receiver is rendered active by the supply of plate potential through back contact 6 of the transmit relay 1TR. The radio receiver is thus normally conditioned for the reception of radio messages which are reproduced by a conventional loud speaker 1LS. It is, of course, assumed that the radio transmitter and radio receiver are both suitably supplied with energy to continuously heat the cathodes of the various electronic tubes involved, but only the radio receiver or the radio transmitter is rendered active at any one time by reason of the shifting of contacts 5 and 6 of the transmit relay 1TR. In other words, when the transmit relay 1TR is picked up, the antenna and the plate supply is disconnected from the radio receiver and connected to the radio transmitter through front contacts 5 and 6 respectively to render it active.

When the radio receiver is in condition for the reception of radio carrier frequency signals, the reception of such a signal regardless of the message superimposed thereon, causes the energization of a carrier responsive relay 1CR. In other words, this carrier responsive relay 1CR is suitably governed by the radio receiver so as to be energized whenever a radio frequency carrier signal is received and to be deenergized at the end of such signal. A slow releasing quick pickup repeater relay 1FP is energized through a front contact 7 whenever the carrier responsive relay 1CR is picked up. In this connection, it is to be understood that the carrier responsive relay 1CR is quick acting both in picking up and in releasing. Whenever the carrier responsive relay 1CR or its repeater relay 1FP is picked up, the busy lamp 1BK is illuminated by reason of its energization through front contacts 13 and 14 by an obvious circuit.

When the operator at the central office desires to transmit a message, he actuates the self-restoring push button 1TB conveniently termed a "talk button." The actuation of the talk button 1TB closes an energizing circuit for the transmit relay 1TR from (+), and including back contact 7 of relay 1CR, back contact 8 of relay 1FP, operated contact 9 of the talk button 1TB, back contact 10 of the code repeating relay 1CP, windings of relay 1TR, to (−). It is apparent that this energizing circuit for the transmit relay 1TR cannot be closed by manual actuation of the talk button 1TB if the radio receiver is receiving a message, because at such time the back contacts 7 and 8 of relays 1CR and 1FP are open. This fact is indicated by the illumination of the busy lamp 1BK, so that under such circumstances the operator should desist from actuating the talk button 1TB.

On the other hand, if there is no message or signal being received, the actuation of the talk button 1TB energizes the transmit relay 1TR and causes the radio receiver to be rendered inactive and the radio transmitter rendered active. As soon as the transmit relay 1TR is picked up, a circuit is closed for energizing the talk lamp 1TK from (+), and including front contact 11 of transmit relay 1TR, back contact 12 of the selector cycling relay 1SC, talk lamp 1TK, to (−). The illumination of the talk lamp 1TK indicates to the operator that he may transmit his message by speaking into the microphone 1MK.

If the operator transmits a message by speaking into the microphone 1MK immediately following the actuation of the talk button 1TB and the illumination of the talk lamp 1TK, such message is transmitted to all mobile train stations within range of the central office; but, if the operator desires to talk with a particular train station only, he follows the actuation of the talk button 1TB with the actuation of the code calling key for the particular train station desired. This actuation of the code calling key for the desired station first steadily energizes the selector cycling relay 1SC and then intermittently energizes the code repeating relay 1CP in accordance with the code call characteristic of that station. The energization of the selector cycling relay 1SC opens its back contact 12 to extinguish the talk lamp 1TK until the code call has been completely transmitted, but when this has been accomplished, the relay 1SC is released so that such talk lamp is again illuminated to advise the operator that he may talk into the microphone 1MK for transmitting his message to the selected station.

In the drawings, a typical code calling key has been indicated in a conventional and symbolical manner, it being understood that in the complete organization, a separate code calling key is provided for each train station so that when a particular train station is desired the appropriate key can be operated. It is assumed for the purpose of this disclosure, that each such key is of the type generally used in a Western Electric selector organization such as shown, for example, in the prior Patent No. 1,343,256 granted to J. C. Field June 15, 1920. However it should be understood that any suitable selector and code calling key apparatus may be employed as desired, the particular type of code calling key and associated selector apparatus at the train stations being indicated merely for the purpose of definiteness in the disclosure. For example, it may be that the code calling key will be of the master dial type where the call number of the train station is coded by the operation of a conventional dial as employed with dial telephones. In such a case, suitable selector apparatus would be employed at the mobile stations to respond to the counting codes in a selective manner.

Since it is sufficient for an understanding of the characteristic features of the present invention to know the functional controls effected by a code calling key, its detail structure will not be discussed. Referring to Fig. 1 of the drawings, it can be seen that the rotation of the typical code calling key in a counterclockwise direction makes connection with the contact 15 as soon as the depression 16 has slightly moved to the left, and this closes an obvious circuit for the selector cycling relay 1SC which is maintained closed until the typical code calling key has made a complete revolution and returned to its normal position. While the code wheel of the typical code calling key is thus operating, suitable cam operating means (shown conventionally as notches) is employed to move the contact 15 upwardly at spaced intervals to intermittently energize the relay 1CP with a characteristic code call. Such intermittent operation of this relay 1CP acts through the intermittent opening of its back contact 10 to cause the transmit relay 1TR to be operated in accordance with the code call being transmitted. It will be apparent that these functions can be accomplished in numerous ways and that the code call pulses can be arranged in any distinctive manner desired.

Considering this operation with respect to the resulting code call signal transmitted, it will be appreciated that the initial actuation of the talk button 1TB causes a steady carrier signal to be transmitted which persists until the code calling key comes to the first position effecting the energization of relay 1CP. But this first position for operating relay 1CP is suitably located on the code dial as to provide a steady carrier signal of a suitable duration even though the selector calling key is initiated into operation substantially at the same time as the talk button 1TB is operated. Following this steady carrier signal pulse, the relay 1CP acts to interrupt the carrier at relatively short intervals to comprise a series of code pulses, each interruption and each carrier pulse transmitted constituting a code element of the counting code of the series. A plurality of such series of code elements are transmitted, and each series is separated from the next succeeding series by a prolonged code condition, i. e., a steady carrier or no carrier at all depending upon the particular condition constituting the last transmitted code element.

Figure 5A:
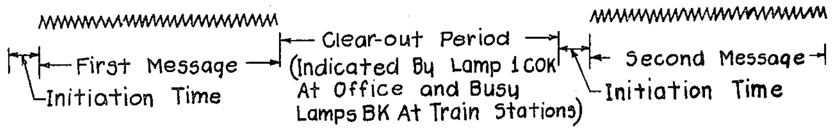
Figure 5B:
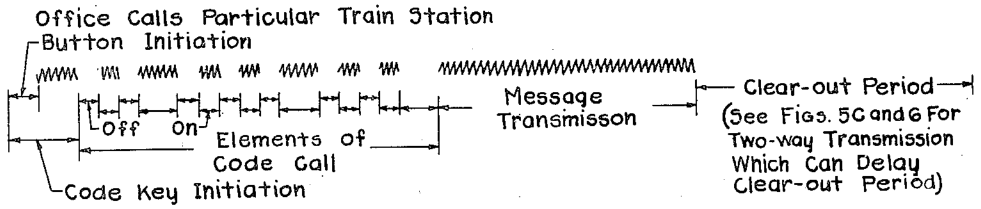

Such a code call has been typically shown in Figs. 5B and 6 to correspond to the code call produced by the typical code calling key of Fig. 1. If the last element of a code is an "off" period, it is made a prolonged condition before the steady carrier is applied for the message transmission. This is so as to properly effect the selection of a station before the selector at that station is restored to normal. On the other hand, if the code call is such that it terminates with an "on" period of the carrier signal, then it directly merges with the carrier signal of the message period without an intervening "off" period, since the removal of the carrier signal at the end of a message acts to restore the selector at the selected station. The code call is, of course, followed by a steady radio frequency carrier signal for the transmission of the desired message as indicated in Fig. 5B which is accomplished by reason of the continued deenergization of relay 1CP and the continued actuation of the talk button 1TB.

Since the back contact 12 of relay 1SC is continuously opened during the transmission of a code call as above described, the talk lamp 1TK is, of course, extinguished, but when the code calling key restores to its normal position, the relay 1SC is released and energizes the talk lamp 1TK to advise the operator that he may now speak into the microphone to transmit a message to the selected station.

At the end of any message, whether it be to a selected station or to all stations, the operator releases the self-restoring talk button 1TB, which opens the circuit of the transmit relay 1TR to render the radio transmitter inactive and restore the radio receiver to its normally active condition for receiving messages. The talk lamp 1TK is obviously deenergized by the deenergization of the transmit relay 1TR. The office also includes a quick-pickup slow-release relay 1CTM which is energized whenever the office transmits or receives a carrier signal. This relay controls a clear-out lamp 1COK through back contact 17 so as to be steadily illuminated under normal conditions, but which clear-out lamp 1COK is extinguished whenever the office transmits a message or whenever the office receives a message. Whenever the clear-out lamp is extinguished, the operator is advised that he must wait for the lamp to become lighted before a new station may be selected or before a new call to all stations is initiated. However, if the operator has effected the selection of a particular train station, he can carry on two-way transmission with such station by operating his talk button as later described although the clear-out lamp is extinguished, keeping in mind that any new selection or new general call must not be initiated until after the clear-out lamp has again become illuminated.

*Typical train station of Fig. 2.*—The train station of Fig. 2 is assumed to be typical of each of the mobile stations considered to be associated with the central office of Fig. 1 to form the complete communication organization contemplated by this invention. Such a train station includes a conventional radio transmitter with its microphone, such as 2MK; and a conventional radio receiver with its loud speaker, such as 2LS. The radio receiver is normally rendered active by reason of its connection to an antenna through back contact 20 of transmit relay 2TR, and also by reason of its connection to a suitable plate supply through back contact 21 of transmit relay 2TR. If the transmit relay 2TR is picked up, the contacts 20 and 21 shift to their front contacting positions rendering the radio receiver inactive and the radio transmitter active.

Associated with the radio receiver is a carrier responsive relay 2CR, which is picked up whenever the associated radio receiver receives a radio frequency carrier signal, regardless of whether there is a voice message superimposed thereon or not; and this relay 2CR is deenergized whenever the radio frequency carrier signal ceases. Associated with this carrier responsive relay 2CR is a front contact repeating relay 2FP and a back contact repeating relay 2BP. These relays 2FP and 2BP are relatively quick to pick up but are slow releasing, the relay 2BP being slower to release than the relay 2FP for reasons which will be explained later.

The typical train station includes a busy lamp 2BK, a talk lamp 2TK, a talk button 2TB, and certain control relays including slow pickup relays 2A and 2B together with a transmit relay 2TR. Another self-restoring button 2CA is employed in addition to the regular talk button 2TB to call all train stations under conditions which will be explained later. The transmit relay 2TR has a repeater relay 2TRP, which also has slow releasing characteristics for reasons explained later.

The typical train station has been shown as including a Western Electric Company selector of the general type disclosed in the above-mentioned patent, No. 1,343,256, granted to J. C. Field, June 15, 1920. This selector is connected through a condenser 2C to the heel of contact 22 of the carrier responsive relay 2CR, so that as the carrier responsive relay 2CR is alternately picked up and released by the reception of code pulses of the station calling code, opposite polarities of energy will be applied to the selector through the condenser 2C from the mid-tap battery 23. In other words, the selector is assumed to be of the so-called alternating current type in which pulses of opposite polarities alternately are required at a predetermined rate in order to operate the selector to its successive positions. The calling code is assumed to be made up of a plurality of groups of different series of pulses which groups are separated by short periods of time. These time separations between groups of pulses may be periods during which the back contact 10 of the code repeating relay ICP in the central office is either closed or opened depending on the code. In either case, this maintains a steady condition of the selector insofar as contact 22 is concerned, but since the condenser 2C is located in the circuit, the coils of the selector are actually deenergized. This allows all selectors to restore to their initial positions except the selectors at the particular stations having code calls corresponding to the code call count up to that particular point. Those that remain in operated positions are further operated upon the reception of the series of impulses of the next group in the code call, but at the end of such series some are restored and some are maintained. This selective process continues until the selector at only one station is fully operated. When the code call has been completed, the selector at a particular selected station closes a contact 24 for the energization of its selector relay, such as relay 2SR, to effect the selecting function, as will be presently described.

It should be understood that any suitable selector apparatus and type of code may be employed, all that is necessary for effecting the purpose of the present invention is that the reception of a distinctive code call by reason of the intermittent or pulsed operation of the carrier responsive contact 22 causes a selector contact to be closed at the end of the code call at one particular train station only, so that at such station the selector relay 2SR will be picked up, but at all other train stations such relay will remain deenergized. The typical train station also includes a selector lamp 2SLK controlled through front contact 36 of relay 2SR so as to be illuminated whenever the associated train station is selected for the reception of a message.

*Operation*

*Normal conditions.*—It is assumed that the central office of Fig. 1 has a plurality of mobile or train stations associated therewith, which may move within a specified area adjacent to the central office and still hold reliable communication with the office. Since the office and all train stations are normally in condition to receive a message, the initiation of communication by the central office or any train station is wholly at the discretion of the operator or trainman at such station. However, all stations, including the office, both transmit and receive over the same carrier frequency channel, so that the system is organized in such a way that the first station initiating transmission locks out all others. This priority is provided between the stations in such a way that each station has the same chance of obtaining access to the communication channel as any other station, but for convenience in the description, the operation of the organization will first be considered from the standpoint of transmission from the office.

*Office calling all train stations.*—As above mentioned, the radio receiver of each train station is normally in condition to receive, and if the central office renders its radio transmitter active and immediately transmits a message by speaking into the microphone IMK, the radio frequency carrier signal is received at each train station and the message superimposed thereon is reproduced by the loud speaker of each train station within range of the central office. At the beginning of such reception, the carrier responsive relay at each station, such as relay 2CR of Fig. 2, is picked up which energizes its busy lamp 2BK and locks out that station.

Specifically, at the typical station in Fig. 2, front contact 25 of relay 2CR energizes its front contact repeater relay 2FP to open back contact 33 and render the actuation of talk button 2TB ineffective. This energization of the carrier responsive relay 2CR also causes the energization of the associated busy lamp 2BK by the closure of front contact 26. It might be noted that this single operation of the contact 22 of relay 2CR has no particular effect upon the associated selector except to cause one stepping operation and then its restoration since no other pulses are immediately received.

Assuming that the operator at the central office transmits a voice message by speaking into the microphone to modulate the radio frequency carrier signal, such signal is received at the train station, amplified, demodulated and reproduced by the loud-speaker 2LS in the usual way. The termination of the reception of such a message and its associated carrier signal results in the deenergization of the carrier responsive relay 2CR. The closure of back contact 25 completes an energizing circuit for the relay 2BP through front contact 27 of relay 2FP while such relay 2FP is releasing. The picking up of the relay 2BP acts to close front contact 28 to provide a supplementary energizing circuit for the busy lamp 2BK including back contact 36 of relay 2SR, but during this time between the release of contact 26 and the closure of the supplementary circuit, lamp 2BK is being energized through front contact 29 of relay 2FP. The picking up of relay 2BP closes its front contact 30 to complete a stick circuit for itself through front contact 27 of relay 2FP. However, after a short time the relay 2FP releases, which opens front contact 27 and allows the relay 2BP to also release after a predetermined time. Thus, the busy lamp 2BK is maintained steadily illuminated following the receipt of a message until the relays 2FP and 2BP both assume their normal deenergized conditions. This advises the operator of the train station to desist from the actuation of his talk button 2TB because such train station cannot be conditioned for transmitting until both of these relays 2FP and 2BP are deenergized.

Since this same operation of the front and back contact repeater relays occurs at all train stations at the same time, it will be readily appreciated that no train station can initiate transmission for a predetermined time following reception of a carrier signal under the circumstances of a general call as above described. The end of this predetermined time or clear-out period is indicated by the extinguishment of the busy lamps BK at the several train stations (see Fig. 5A).

At the office, the transmission to all stations of a general call is effected during the picked up condition of relay 1TR, which energizes the relay 1CTM through front contact 18. Thus, at the termination of the transmission from the office, the relay 1CTM is deenergized and begins to measure a predetermined time substantially corresponding to the time measured by the release of relays FP and BP at the several train stations. This keeps the clear-out lamp 1COK dark until the train stations have restored to normal conditions. As soon as the clear-out lamp 1COK becomes lighted, it advises the operator at the office that he can initiate a new call either to all stations or to some particular station as desired.

This general condition of transmission has been indicated in the diagram of Fig. 5A. The initiation time represents the time required for the operation of the talk button and the transmit relay, while the application of the steady carrier signal provides for the transmission of the first message. Following this first message, a certain length of time has been indicated as being required for the clear-out period as indicated by the lamp 1COK at the office and the busy lamps BK at the train stations. This clear-out period, of course, must be followed by another initiation time before the second message can be transmitted from the office. Although only two messages have been indicated in the diagram of Fig. 5A, it should be understood that any number of messages may be successively transmitted, but whenever a general call is transmitted from the office or from any train station, a succeeding call should not be made made until after the clear-out period has elapsed.

*Office calls a particular train station.*—Let us assume that the operator at the central office desires to communicate with a particular train station from among those train stations within range of the office. In a case of this kind, it is usually desirable for the office to first select the desired train station and transmit a suitable calling message requesting the reply of the selected train station before continuing with the specific message which the operator has for that station. In accordance with the present invention, it is proposed to effect this type of call with the transmission of only a single code call to select the desired station, after which the office and the selected station may hold two-way communication without any further need for selecting code calls. It is also proposed that throughout such two-way communication between the central office and the selected station that all other train stations will be locked out or prevented from interfering with the communication channel.

To effect the selection of a particular station, the operator actuates his talk button 1TB followed by the actuation of the code calling key for a desired station, such as the typical code calling key shown for the typical train station of Fig. 2. This causes the successive energization of the relays 1TR and 1CTM as indicated in the sequence chart of Fig. 6. The operator may operate the code calling key at the same time or shortly following the operation of the talk button 1TB. This causes the picking up of the relay 1SC, which remains picked up throughout the operation of the code calling key dial by reason of the movable contact 15 being in contact with the dial as soon as the depression 16 is slightly moved to the left. After an interval of time during which a steady carrier signal is transmitted, the relay 1CP is picked up which causes the deenergization of the transmit relay 1TR by reason of the opening of back contact 10. This is because the code calling key dial has so moved the movable contact 15 as to close with its back point and cause the relay 1CP to be energized to place a space in the carrier signal being transmitted.

The application of the initial steady carrier signal by the initial picking up of the transmit relay 1TR is for a sufficient time to effect the picking up of the carrier responsive relay at each train station together with its associated front contact repeater relay, which at the typical station of Fig. 2 is relay 2FP. The first closure of contact 15 to energize relay 1CP causes a space in the carrier signal as indicated in Fig. 6 of suitable length to cause the release of the carrier responsive relay at each of the train stations to in turn effect the energization of the associated back contact repeater relay, which at the typical station of Fig. 2 is relay 2BP. This picking up of the back contact repeater relay 2BP closes a front contact 30 of relay 2BP to complete a stick circuit for the relay 2BP dependent upon the continued closure of front contact 27 of the relay 2FP. As the carrier signal is pulsed to comprise code elements of a code call, the various pulses are sufficiently close together to cause the front contact repeater relays FP at the several stations to be maintained picked up although they are only intermittently energized. It should also be noted that these front contact repeater relays FP are sufficiently slow-releasing so as to be maintained picked up during certain prolonged periods between different groups or series of code pulses constituting a code call and made distinctive by these prolonged periods of either an "off" or an "on" condition of the carrier signal as the case may be, all of which is indicated in the sequence chart of Fig. 6.

Returning to the initial pickup of the back contact repeater relay BP at each train station, it will be noted that a front contact, such as contact 31 of relay 2BP of Fig. 2 acts to complete a shunt circuit through back contact 32 of the selector relay 2SR for the associated loud speaker 2SL. In other words, the loud speakers are rendered ineffective at all stations within range of the central office by the initial carrier signal followed by the first "off" period. Although this has been shown as being accomplished by the shunting of the loud speakers, it is to be understood that the loud speakers might be rendered ineffective in any other suitable manner, such as by the opening of their circuits, or the control of the signal producing amplifiers.

The different code pulses and spaces between the pulses are repeated by the carrier responsive relays CR at the several train stations and they respectively cause the associated selectors to be operated in accordance with the code call. But at only one particular station is its selector completely operated through the fixed number of steps comprising a selecting cycle so as to operate its selector contact for the energization of its selector relay SR.

Assuming that the typical code call effects the selection of the typical train station of Fig. 2, then the selector contact 24 is closed at the end of the code call which closes a circuit for selector relay 2SR from (+), through front contacts 33 and 34 in multiple, selector contact 24 in a closed position, windings of selector relay 2SR, to (−). As soon as the selector relay 2SR is picked up, it closes its front contact 35 to shunt the selector contact 24, i. e. to provide a stick circuit. Thus, regardless of the subsequent opening of the contact 24, the selector relay 2SR is dependent for energization upon its control relays 2FP, 2BP, and 2TRP under conditions presently to be described.

The picking up of the selector relay 2SR opens back contact 32 to render the associated loud speaker 2LS effective for the reception of the voice message transmitted from the central office, whereas at all of the other stations the selector relays are deenergized and their loud speakers are ineffective to reproduce the message. In this way the central office can effect the selection of a particular station to which it desires to transmit a message.

In the selecting organization above described, the selectors at all of the stations except the selected station return to their initial positions during the reception of the code call because their code calls do not agree with the one received. But at the selected station, the selector is held in a position to close its selecting contact until the message carrier signal is received, because, as explained in connection with the typical code calling key, the next change in conditions of the communication channel following the code call causes the selector of the selected station to be restored to its normal condition as indicated with respect to contact 24 of the selector in Fig. 6. In some of the codes this last element of the code call comprises an "off" period which as illustrated in Fig. 5B as slightly prolonged so that the selector relay 2SR has sufficient time in which to be picked up before the carrier signal for the message is received and acts to cause the selector to receive a pulse for its restoration. However, since some codes used with such a selector end with an "on" period of the carrier signal, such a last code element can merge directly into the carrier signal for the message transmission and in this way the contact 22 of the carrier responsive relay 2CR will not shift until the end of the message at which time the relay 2CR being released causes a pulse to be supplied to the selector which acts to effect its restoration. Regardless of whether the selector is restored before or after the message, the selector relay at the selected station remains picked up during the reception of the message and for a predetermined time thereafter by reason of its stick circuit which is closed so long as a carrier signal continues to be received and dependent upon certain timing operations as will be described.

If at the end of the message no further communication is desired, the cessation of the reception of radio carrier frequency signal allows the carrier responsive relay at each of the train stations to become deenergized which is in turn repeated by the sequential deenergization of the front and back contact repeaters, such as relays 2FP and 2BP of Fig. 2. Thus, in due course the stations return to their normal conditions at the end of a clear-out period as indicated in Fig. 5B.

On the other hand, it may often be desirable for the selected station to acknowledge its selection and readiness for reception to the central office without the possibility of interference by one of the non-selected stations and without the further transmission of selecting codes. In view of this desirable attribute of such an organization, the present invention provides that the selected station can reply to the central office maintaing selective communication therewith if such reply is initiated prior to the elapse of a predetermined time constituting a clear-out period.

*Two-way communication with selected station.*—Let us assume that the typical train station of Fig. 2 is the selected station, and that the operator desires to acknowledge selection to the central office in view of the call that he has just received. To do this he actuates the talk button 2TB as soon as the central office ceases to transmit a carrier signal. The operator at the train station can readily distinguish between the cessation of the carrier signal and the spaces that may occur in a voice message since the busy lamp 2BK is extinguished as soon as the carrier signal ceases and before the interval of time measured by the back contact repeater relay 2BP has elapsed. This is because at the selected station, the busy lamp is dependent upon the carrier responsive relay and its front contact repeater relay, whereas at the other stations the busy lamp is maintained lighted until the slow release back contact repeater relay has dropped away. For example, in Fig. 2 the picking up of the selector relay 2SR opens back contact 36 removing energy from front contact 28, so that the lamp 2BK receives energy during the reception of a carrier signal from the central office only through the front contact 26 of relay 2CR in multiple with front contact 29 of relay 2FP.

It should also be noted that during the reception of the signal from the central office at the selected station, the closure of front contact 37 of the selector relay 2SR energizes the relay 2B through an obvious circuit. Also, the closure of front contact 38 of relay 2SR shunts the back contact 39 of relay 2BP. Thus, as soon as the front contact repeater 2FP is deenergized and the busy lamp 2BK is extinguished, the operation of the talk button 2TB immediately closes a circuit for the transmit relay 2TR from (+), and including back contact 33 of relay 2FP, front contact 38 of relay 2SR, talk button 2TB in an actuated position, back contact 40 in multiple with the front contact 41 of relays 2A and 2B respectively, windings of transmit relay 2TR, to (−). It will be noted that the slow pickup relay 2A is also energized directly from the back point of the talk button 2TB, so that after an interval measured by its pickup characteristics, the back contact 40 is opened, but the front contact 41 of the relay 2B remains closed so that the transmit relay 2TR is steadily energized (see Figs. 6A and 6B).

The picking up of the transmit relay 2TR, of course, shifts its contacts 20 and 21 to render its associated radio transmitter active. Since the relay 2B is already picked up, the talk lamp 2TK immediately becomes illuminated by reason of a circuit closed from (+) and including front contact 42 of relay 2TR, front contact 43 of relay 2B, lamp 2TK, to (−). The operator is thus immediately informed that speaking into the microphone 2MK will effect the transmission of a message.

This transmission of a radio carrier frequency signal prior to the elapse of the time measured by the release of the back contact repeater relays, such as relay 2BP, causes the carrier responsive relays at all of the non-selected stations to be picked up prior to the release of their back contact repeater relays and thus reenergizes their front contact repeater relays and holds their back contact repeater relays picked up in this way maintaining their non-selected condition.

At the selected station, such as in Fig. 2, the energization of the transmit relay 2TR closes a circuit from (+), and including front contact 44 of relay 2TR, windings of relay 2TRP, to (−). This repeater relay 2TRP is relatively quick to pick up, but has a slow releasing characteristic substantially corresponding to the sum of the release times of both the front and back contact repeater relays, such as relays 2FP and 2BP (see Figs. 6A and 6B). The closure of its front contact 46 applies energy to the selector relay 2SR so that it is maintained picked up after the back contact repeater relay 2BP releases and throughout transmission from this station and for a predetermined time thereafter as measured by the release period of relay 2TRP.

When the operator of the selected station completes his message, he releases the talk button 2TB. The central office may reply to this particular previously selected station without requiring the operation of its code calling key if the central office operator actuates the talk button within a limited time. In other words, as soon as carrier responsive relay 1CR and its repeater relay 1FP releases in the central office, the actuation of the talk button 1TB causes the transmission of a steady carrier frequency signal which will be received by all stations. If this signal is received prior to the elapse of the time measured by the release of the back contact repeater relays of the non-selected stations, then their front contact repeater relays will be picked up to maintain the back contact repeater relays energized which obviously prevents such stations from receiving any message that may be transmitted from the central office. At the selected station, the release of the transmit relay 2TR deenergizes the repeater relay 2TRP but since this relay is slow releasing to the extent of the release times of both the relays 2FP and 2BP, the selector relay 2SR is maintained picked up through front contact 46 until the carrier signal is received from the central office and reenergizes relay 2FP to close front contact 33 to maintain relay 2SR energized throughout reception. This maintains the back contact 32 open so that the message from the central office is received by this selected station.

This back and forth or two-way transmission can be carried on between the central station and the selected train station as many times as desired so long as each shift in direction of transmission is effected within the time interval provided by the release time of the back contact repeater relays, such as relay 2BP.

Figure 5C:
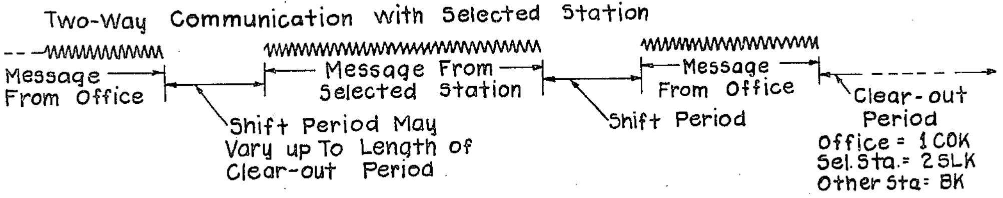
Figure 5D:
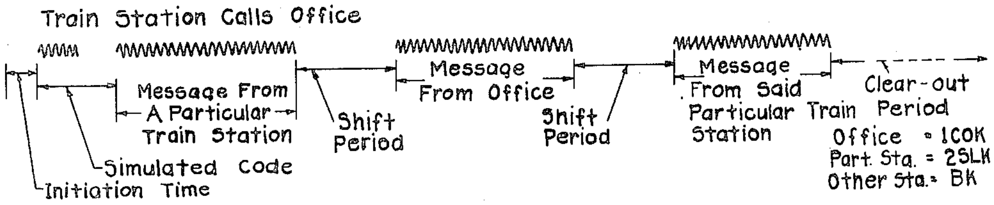
Figure 5E:
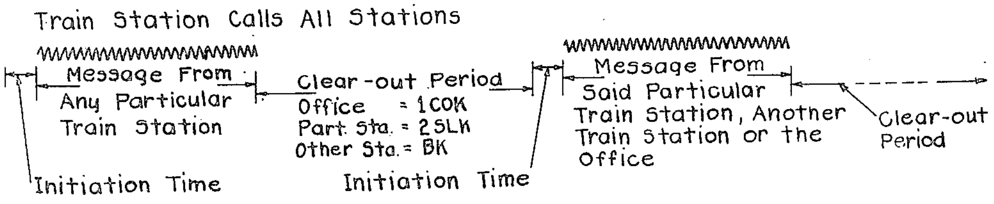

This reversal in direction of transmission has been indicated in Figs. 5C and 6 for only the number of times corresponding to a call by the office, the acknowledgement by the selected station, and the transmission of a message by the office, but this is to be considered merely as typical. Referring to Fig. 6 it will be seen that the shift period between transmission in opposite directions involves certain relay operations which determines the minimum time in which the change or shift in directions can take place, but if the operator delays actuating the talk button after the busy lamp BK is extinguished then the shift period will be longer. However, it should be understood that the variations in the shift period may not exceed the time for a clear-out period and preferably should be slightly less so as to allow for any variations in relay timing operations that might be present due to variations in the source of electrical supply energy and the like.

If at any time the central office operator desires to discontinue transmission with the selected station, he merely fails to transmit within the predetermined time interval and thus causes the selection to be erased because the opening of both front contacts 33 and 34 results in the release of the selector relay 2SR. In connection with this two-way communication, it will be noted that both the selected train station and the central office effect their transmission of signals directly and without even the simulation of a selecting code as is used when a train station initially calls the office as will be presently described. This actually causes the back contact repeater relays, such as relay 2BP, to be picked up continuously at all stations, except the selected station, until the two-way communication ceases for a time greater than the release times of these relays. But at the selected station, the relay 2BP for example is not picked up during transmission from that station and remains deenergized until the end of the next reception from the office (see Fig. 6). The release of relay 2CR at such time energizes relay 2BP and causes it to pick up before relay 2FP releases. Thus, the same conditions are established as if the station had just received a message following a selection operation. In this way contact 34 is closed before contact 33 opens and the selector relay 2SR is maintained picked up for the predetermined limited time constituting a clear-out period.

At the selected station, the cessation of transmission from the office is indicated by the extinguishment of the busy lamp 2BK, but the operator at such selected station is advised against endeavoring to initiate a new transmission from his station by reason of the illuminated condition of the selector lamp 2SLK which will not become extinguished until the end of the clear-out period. At the other stations, the selector relays SR are not picked up, so that the busy lamps are maintained illuminated by reason of the closure of contacts corresponding to contacts 28 and 36 of relays 2BP and 2SR in Fig. 2. Thus, at these other stations the operators are advised against initiating a new transmission until the end of the clear-out period.

In the central office, the relay 1CTM is picked up by the initiation transmission from the central office by reason of closure of front contact 18 of relay 1TR, and this relay 1CTM is maintained picked up throughout the two-way operation of the system since the reception of carrier signals closes front contact 19 of relay 1CR to energize relay 1CTM during such time. With a suitable release period selected for this clear-out timing relay 1CTM, it does not release when once picked up until the end of the clear-out period (see Figs. 6A and 6B). Thus, the clear-out lamp 1COK is extinguished at the beginning of the transmission from the office and is not re-illuminated until the elapse of the clear-out period. In this way, the operator at the central office is advised against initiating a new selecting operation or a general call to all stations until the lamp 1COK is again lighted. It might be noted in this connection that although the clear-out period may not occur at exactly the same instant at all stations due to slight variations in relay times, variations in energy supply potentials, and the like, a certain amount of variation can be tolerated and still provide protection against an operator initiating a new transmission before all stations have been cleared out, since there is always a certain amount of initiating time required for the operation of the talk button, transmit relays and the like, which serves to provide a limited margin between successive conditions.

*Train station initiates call to office.*—In the event that the operator at a train station desires to communicate with the central office without allowing the other train stations to hear his message, he can do this merely by actuating the talk button TB and speaking into the microphone MK following the illumination of the associated talk lamp TK. Such actuation of the talk button TB while the station is in a normal condition, causes the transmission of a carrier signal with a brief interruption at the beginning of such signal to simulate the beginning of a code call but which, of course, is not a complete code (see Fig. 5D). This transmission of an artificial or simulated code call causes all other stations to be non-selected so that only the central office will receive and hear the message.

More specifically considering this operation with respect to the typical station of Fig. 2 and the sequence chart of Fig. 7, the actuation of the talk button 2TB causes the energization of the relay 2A by a circuit including back contacts 33 and 39 and the back contact of button 2TB, but since the relay 2A is slow to pick up, its back contact 40 is closed for an interval of time sufficient for the picking up of the transmit relay 2TR to initially cause the train station to transmit a radio carrier frequency signal for a short interval before back contact 40 opens. After the short interval of time measured by the pickup characteristics of the relay 2A, relay 2TR is released and front contact 47 is closed to energize the slow pickup relay 2B. At the same time that front contact 47 is closed, the back contact 40 is opened so that the transmit relay 2TR is released until the slow pickup relay 2B closes its front contact 41 in spite of the continued actuation of the talk button 2TB. In brief, the relays 2A and 2B so cooperate with the talk button 2TB and the transmit relay 2TR as to cause the carrier signal to be temporarily interrupted near its beginning.

The pickup time of the relay 2A corresponds to the time required for a code key dial to first energize relay 1CP in the office, and the pickup time of relay 2B is substantially the same as the time during which relay 1CP is picked up in sending certain of its code elements (see Figs. 6A and 7). In this way, the relays 2A and 2B simulate the beginning of a code call without any subsequent pulses. The reception of such a carrier signal at each of the other stations causes the successive picking up of their front and back contact repeaters corresponding to relays 2FP and 2BP of Fig. 2, which causes such stations to be ineffective for the reception of a message for reasons previously explained.

At the central office the picking up of the relay 1CR at the initiation of the radio carrier frequency signal locks out the central office and effects the picking up of the relay 1FP, the same as the relays FP at the other stations. Since the relay 1FP is slightly slow releasing, it remains picked up during the brief interruption of the carrier signal by the train station simulating a code call and thus maintains back contact 8 at the central office open so that there can be no interruption of the signal thus initiated.

At the train station initiating the transmission, the talk lamp is not illuminated until the transmit relay is energized for the second time, i. e. following the brief interruption of the carrier signal. More specifically, the talk lamp 2TK cannot be energized upon the first energization of the relay 2TR because front contact 43 of relay 2B is then open, but when the relay 2B closes front contact 43 followed by the picking up of relay 2TR due to its being energized through front contact 41, the contacts 42 and 43 are both closed, so that the talk lamp 2TK is illuminated advising the operator that he can begin the transmission of his message (see Fig. 7).

During this transmission from the train station, the energization of the transmit relay 2TR causes the repeater relay 2TRP to be picked up which in turn picks up the selector relay 2SR to simulate that this station has a distinctive relationship to the central office with respect to other stations, and in fact the effect is the same as if the train station had been selected by the office. For this reason, upon the cessation of transmission from the train station, the central office can establish communication with this particular station to the exclusion of other train stations by merely actuating the talk button 1TB and transmitting a carrier signal with the desired superimposed message, within a limited time not exceeding the time required for a clear-out period. This operation has been assumed in the preparation of the sequence chart of Fig. 7, where it is indicated that the talk button 1TB is actuated as soon as the busy lamp 1BK is extinguished. When the transmit relay 1TR picks up, the talk lamp 1TK is lighted so that the operator is advised to transmit his message by speaking into the microphone. In the chart of Fig. 7, the shift period during which the direction of transmission is changed, is shown as comprising certain relay operations and assumes the immediate actuation of the talk button 1TB. However, it should be understood that a slight delay in the operation of the talk button is not material, since the shift period may vary up to the length of the clear-out period. This is so as to allow the operator sufficient time to recognize the extinguishment of the busy lamp 1BK and effect the operation of the talk button for a reply to the train station. Also, it should be noted that the message periods may be as long as desired to transmit the particular message, it being readily appreciated that the times allotted to the message periods in the chart of Fig. 7 are made relatively short merely for the purpose of conserving space.

In other words, the transmission from a train station establishes the same lockout conditions at other train stations as is established by the selection of that particular station by the transmission of a distinctive code from the central office. In other words, two-way transmission between the central office and any particular train station to the exclusion of other train stations may be initiated either by the central office or by the particular train station. In the case of the central office, initiation of the two-way exclusive communication channel requires a distinctive code call; whereas in the case of initiation of the exclusive communication channel by the train station no code call is required but merely an artificial simulation of such a code call.

*Train station calls all stations.*—There may be occasions in which a train station will desire to call other trains as well as the office. Let us assume that the operator at the station of Fig. 2 desires to do this. He actuates the button 2CA followed by the actuation of the talk button 2TB. The actuation of the button 2CA closes contact 48 to directly energize the relay 2B so that upon the actuation of the talk button 2TB, the transmit relay 2TR is directly energized through back contacts 33 and 39, and front contact 41. It is maintained energized through this circuit until the end of the transmission from this station. Since the relay 2B is directly picked up by the button 2CA, the talk lamp 2TK is illuminated as soon as the transmit relay 2TR picks up. In other words, this train station under such a condition transmits a steady carrier signal upon which the operator may superimpose a message by speaking into the microphone 2MK as soon as the talk lamp 2TK becomes illuminated. This seady carrier signal, without any interruptions to simulate a code call, causes all stations including the office to merely pick up their front contact repeater relays and receive the message.

At the sending station, the energization of the transmit relay 2TR closes front contact 44 to energize the repeater relay 2TRP which in turn energizes through front contact 46 the selector relay 2SR. Thus, the selector lamp 2SLK is energized through front contact 36. This energized condition of the selector relay 2SR is maintained throughout transmission from the station and for a predetermined time after the operator releases the talk button 2TB and deenergizes the transmit relay 2TR at this station, which predetermined time corresponds to the clear-out period (see release of relay 2TRP in Fig. 7). Thus, the operator at this station, after having once made a general call to all stations is advised against initiating another call until the clear-out period has elapsed as indicated by the selector lamp 2SLK becoming extinguished.

At the central office, the reception of the carrier signal from the train station causes the picking up of the carrier responsive relay 1CR which energizes through front contact 19 the clear-out timing relay 1CTM. This extinguishes the clear-out lamp 1COK and maintains it extinguished for a predetermined time after the particular train station ceases its transmission. This advises the central office against initiating a new call to all stations or to a particular station until after the elapse of the clear-out period.

At the other train stations, the front contact repeater relays FP are picked up during the reception of the message from the particular station then transmitting, so that at the termination of such transmission, the deenergization of their carrier responsive relays, such as relay 2CR of Fig. 2, closes a pickup circuit for their respective back contact repeater relaps BP. In this way, the busy lamps BK at all of the other stations are maintained illuminated until the elapse of a time measured by the release times of front and back contact repeater relays, such as relays 2FP and 2BP, which time corresponds with the clear-out period.

In this way all stations including the office are advised against initiating a message following a general call from a train station until the elapse of the clear-out period. This general characteristic of the operation has been indicated in Fig. 5E where the message from a particular train station is separated from another message from the same train station, some other train station, or the office, by the clear-out period as well as the usual initiation time required for a transmission.

From the above description it will be apparent that all calls, whether selective or general, may be initiated only a predetermined time after any preceding call, which predetermined time constitutes a clear-out period for restoring the system organization to its normal conditions. However, whenever a selective call either by the office or some train station takes place, two-way communication can be established between the office and the particular station in question in such a way that the direction of transmission can be shifted as often as desired and still maintain the selected condition of the communication channel to the exclusion of other stations so long as such shift in direction of transmission is effected within the limited time constituting the usual clear-out period.

*Organization of modified form*

With reference to Figs. 3 and 4, a modified form of central office and a typical train station is illustrated, and it is assumed that this central office is strategically located with regard to the terminal area or other communication area within which a plurality of mobile or train stations such as shown in Fig. 4 may be located. The modified typical train station of Fig. 4 is, of course, assumed to be typical of all of the plurality of mobile stations within range of the central office of Fig. 3.

The system organization illustrated in these Figs. 3 and 4 include the characteristic features of the organization shown in Figs. 1 and 2, in that a selective talking organization is provided which operates upon the so-called "closed circuit principle." However, certain additional features are provided in this modified form of the present invention, which additional features are so organized as to properly cooperate with a selective talking organization.

One feature characteristic of this form of the invention is that a continual check upon the availability of the communication channel is provided between the central office and the plurality of mobile stations. This check is in the form of the transmission of check pulses from the central office so as to maintain a check lamp illuminated at each of the mobile stations so long as the communication channel is available and until that station receives a message. Such a feature in a selective talking organization must obviously be so coordinated with the selecting devices that the check indicator lamps will be maintained illuminated at all mobile stations except the one being called, and yet be arranged to become extinguished upon the failure of the system.

Another characteristic feature of this form of the invention is that voice and/or facsimile messages can be transmitted from the central office to the mobile train stations.

*Central office of Fig. 3.*—The central office as shown in this modified form includes a conventional radio transmitter and a radio receiver having the respectively associated microphone 3MK and loud speaker 3LS. These conventional devices may be of any suitable type, the same as explained in detail in connection with Figs. 1 and 2. The apparatus also includes a conventional facsimile transmitter, a tone generator, a continuously coding contact 100, a typical code calling key, suitable indication lamps, relays, push buttons, and the like.

The radio receiver is normally connected through back contact 105 of relay 3TR to a suitable antenna, and this radio receiver is rendered active by its connection through back contact 106 to a suitable plate supply potential indicated as a battery. Although the radio receiver is thus normally conditioned for the reception of radio frequency carrier signals, any message superimposed upon such carrier signals is not reproduced by the loud speaker 3LS, unless a tone responsive relay 3TN is picked up opening back contact 123 or a monitoring button 3MB of the self-restoring type is manually actuated. These devices are provided for reasons which will be later explained in detail.

The radio transmitter and radio receiver are both supplied with suitable energy to continuously heat the cathodes of the various electronic tubes employed, but only the receiver or the transmitter is rendered active at any one time. The radio receiver being normally active, is rendered inactive by the picking up of the transmit relay 3TR, whereas the radio transmitter is then rendered active because the antenna is connected to it through front contact 105, and it is supplied with suitable plate potential through front contact 106. However, messages are transmitted by the radio transmitter subject to certain conditions which will be explained more in detail as the description progresses.

The reception of a radio frequency carrier signal by the radio receiver causes the energization of a carrier responsive relay 3CR regardless of whether or not a message is superimposed upon the carrier signal. Also, associated with the receiver is a tone responsive relay 3TN connected to the radio receiver through a rectifier unit 101 and a filter 102. This filter and rectifier organization provides that the tone responsive relay 3TN is effectively energized for picking up its contacts only provided the received radio frequency carrier signal has superimposed thereon a distinctive tone frequency which is passed by the filter 102. It should be understood that both the carrier responsive relay 3CR and the tone responsive relay 3TN are quick acting relays both in picking up and in releasing.

Associated with the radio transmitter is a tone generator which causes a suitable tone frequency to be superimposed upon the carrier frequency whenever this tone generator is rendered effective while the radio transmitter is active. This distinctive tone frequency is preferably in the inaudible range, but may be of any suitable frequency above those frequencies employed for the transmission of voice messages. For example, if the voice frequencies ordinarily employed are between 200 and 3,000 cycles per second, then this distinctive tone could be in the order of four or five kilocycles provided, of course, that such distinctive frequency is filtered away from the voice reproducing circuits. On the other hand, if a supersonic tone frequency in the order of twenty-five or thirty kilocycles is employed, then the filtering of the voice circuits will be less important, since such frequencies are inaudible even though present in the voice reproducing circuits. In any event, the purpose of the filter 102 is to prevent the tone relay from being operated by the voice frequencies or any of the frequencies employed for the facsimile transmitter, or any other frequencies different than the particular tone frequencies selected. For this reason the filter 102 should preferably be a band-pass filter.

A talk button 3TB and an associated repeating relay 3TBP is provided to initiate transmission from the central office as desired by the operator. When a particular mobile or train station is to be called, the operator, after actuating the talk button 3TB, also operates the code calling key corresponding to the mobile station with which he desires to communicate. The typical code calling key illustrated, is intended to be representative of each of the separate code calling keys provided for the different mobile stations, and is assumed to have the same characteristics as explained more particularly in connection with the typical code calling key shown in Fig. 1.

On the other hand, if an operator desires to call all the trains or mobile stations, he actuates the talk button 3TB followed by a momentary actuation of the button 3CA, and these two self-restoring push buttons together act to initiate the communication with all mobile train stations without the operation of the calling keys for such stations. The call-all-trains push button 3CA has associated therewith a repeater relay 3CAP.

The code calling keys have an associated code repeating relay 3CP which is governed by the contact 110 of each key so as to repeat the code call to be transmitted. There is also a relay 3SC which is energized while any code calling key is in operation. A repeater relay 3SCP is controlled by relay 3SC and also by the button repeater relay 3TBP.

A clear-out timing relay 3CTM is a quick pick-up slow release relay, which is energized under certain conditions later described to determine during its release period the length of the clear-out period at the end of a transmission as indicated by the associated clear-out lamp 3COK. This clear-out lamp 3COK is normally energized through back contact 125 of relay 3CTM.

While the radio transmitter is active and communication is established between the central office and one or all of the train stations, the operator may actuate a stay-where-put lever 3FT for effecting facsimile transmission. When this lever 3FT is in a left-hand position, the associated facsimile transmitter acts to superimpose suitable frequencies on the radio frequency carrier signal so as to transmit a message to the mobile train station or stations, as the case may be, in a conventional manner.

The central office also includes suitable indicator lamps, such as the talk lamp 3TK which is illuminated whenever the system is ready for the transmission of voice and/or facsimile messages. A busy lamp 3BK is provided to indicate when the communication channel is being employed, regardless of whether the central office is hearing a voice message or not.

*Typical train station of Fig. 4.*—This train station of Fig. 4 is, of course, typical of each of the mobile stations employed in the complete organization contemplated by the present invention. The station includes a conventional radio transmitter with its microphone 4MK, and a conventional radio receiver with its loud speaker 4LS. The radio receiver is normally rendered active by reason of its connection to the antenna through back contact 200 of the transmit relay 4TR and by reason of its connection through back contact 201 to a suitable plate supply of energy.

Associated with the radio receiver is a carrier responsive relay 4CR, which responds to radio frequency carrier signals regardless of the presence or absence of modulating tones or messages. This carrier responsive relay has associated therewith a front contact repeater 4FP and a back contact repeater 4BP, which relays are quick-pick-up, slow-release relays having characteristics later explained in detail, but which relays are normally maintained energized by the intermittent or carrier responsive relay 4CR due to the normal reception of check pulses. These relays are energized through contact 202 of relay 4CR by obvious circuits, and when both relays are picked up, a circuit is closed for a normally energized check lamp 4CK from (+), and including front contact 203 of relay 4FP, front contact 204 of relay 4BP, lamp 4CK, to (—). Associated with the check lamp 4CK is also a suitable single stroke bell B which is normally energized and which sounds with a single stroke upon its deenergization.

Also, associated with the radio receiver is a tone responsive relay 4TN which is governed through a rectifier unit 205 and a filter unit 206 of the type so as to be supplied with energy from the radio receiver only upon the presence of a distinctive tone frequency as demodulated from the radio carrier frequency and corresponding to the distinctive tone transmitted by the central office or one of the other train stations. This tone responsive relay 4TN has a quick-pick-up, slow-release repeater relay 4SA controlled by an obvious circuit including front contact 207.

A suitable Western Electrical Company selector, such as described in connection with Fig. 2, is connected through condenser 4C to the opposite terminals of the mid-tap battery 208 by contact 209 of the tone responsive relay 4TN during the operation of this tone responsive relay. The operation and control of the selector is the same as described in connection with Fig. 2, except that in this form the selector is governed by a contact 209 of the tone responsive relay 4TN instead of by a contact of the carrier responsive relay. A selector relay 4SR is also associated with the selector and functions as will be presently described.

A talk button 4TB of the self-restoring type is provided to initiate communication with the central office to the exclusion of the other train stations. This is effected by the energization of the transmit relay 4TR in a manner later described, which shifts the front contacts 200 and 201 to their front point positions to render the radio receiver inactive and the radio transmitter active. Associated with the radio transmitter is a suitable tone generator providing the same distinctive frequency as produced by the tone generator at the central office and at each of the other mobile stations. This distinctive tone frequency also corresponds to the frequency to which the tone relays TN respond.

In the event that the operator of a mobile station desires to communicate with all other mobile stations, he actuates the talk button 4TB and also the call-all-stations button 4CA which acts to eliminate the transmission of the distinctive tone by this station to effect the communication with the other mobile stations in a manner presently to be described in detail.

Each mobile station as typically shown in Fig. 4 also includes a talk lamp 4TK and a busy lamp 4BK. A clear-out lamp 4COK is normally illuminated, but is extinguished whenever the system is employed for selective talking and is not reilluminated until the elapse of the clear-out period at the end of such selective talking. But since no clear-out period is required in this form of the invention following a general call by the office or some train station, the clear-out lamp 4COK remains illuminated throughout any general call communication conditions. The energizing circuit for the clear-out lamp 4COK is normally closed from (+) and including back contact 235 of relay 4SA, back contact 221 of relay 4TRP, lamp 4COK, to (—).

Operation

*Normal conditions.*—Under the normal conditions, i. e. when there is no message being transmitted from the central office or from any mobile train station, check pulses are transmitted from the central office at regularly spaced intervals. This is accomplished by the intermittent energization of the transmit relay 3TR of Fig. 3 by a circuit intermittently closed from (+) and including coding contact 100, back contact 197 of carrier responsive relay 3CR, transmit relay 3TR, to (—).

The coding contact 100, may be of any suitable type, such as a contact operated by a constantly running motor or may be a suitable combination of contacts on oscillating relays, or the like. For example, the coding contact 100 might be replaced by two oscillating relays such as shown in the prior patent to N. D. Preston, Pat. No. 2,408,878, dated October 8, 1946. Such an organization provides means for stopping the operation of the coding contacts during transmission and reception and again initiating such operation a predetermined time after the cessation of such transmission or reception. In this way the check pulses following any particular transmission by the office or a train station would always follow after a predetermined time. Although this provides certain desirable timing characteristics, the single coding contact 100 has been shown for the sake of simplicity in the disclosure, and may be assumed to have any suitable desirable timing characteristics above mentioned, but preferably so organized as to provide for the momentary energizations of the transmit relay 3TR to be separated by relatively larger spaces. For example, relay 3TR can be energized for about a half second and then deenergized for about three and one half seconds. These times are, of course, variable and should be selected in accordance with the various practical conditions involved in the selection of apparatus; however, it is desirable to have the space between successive pulses sufficiently long for a mobile station to break in upon the transmission of the check pulses in order to gain control of the communication channel.

During the transmission of the check pulses the microphone 3MK is ineffective since the contact 108 of the button repeating relay 3TBP is normally open. Also, the tone generator is inactive since its control circuit is open at this time at front contact 119 of relay 3SCP. Thus, the check pulses are short pulses of unmodulated radio frequency carrier signal (see Fig. 8A).

These intermittent check pulses are received at each of the train stations within the communication area or range of the central office, and effect the intermittent operation or energization of the respective carrier responsive relay at each such station, such as relay 4CR of Fig. 4. As above explained, the intermittent operation of contact 202 of relay 4CR maintains the front repeater relay 4FP picked up as well as the back contact repeater 4BP. The relay 4BP needs to be only sufficiently slow-acting to remain picked up during the presence of each of the successive check pulses as repeated by relay 4CR, whereas the front contact repeater relay 4FP must be sufficiently slow-releasing to remain picked up between the successive check pulses as repeated by relay 4CR. Thus, the check lamp 4CK is maintained energized and also the bell B is maintained energized. In the event of failure of the central office to transmit such check pulses or the train station to receive such check pulses, the relay 4FP fails to be intermittently energized and drops away which causes the indicator lamp 4CK and the bell B to be deenergized, thus bringing the condition to the attention of the operator both visually and audibly. This same indication is also given at the beginning of each message to be received by the mobile station, so that in the event of failure to receive the message, the operator is advised that the communication facilities have failed.

While check pulses are being received and relay 4BP is maintained energized, the loud-speaker 4LS is muted because of shunting contact 210 and the facsimile recorder is rendered ineffective because of shunting contact 211. This prevents any radio noises from being reproduced during normal conditions.

*Calling a selected train station.*—Let us assume that the operator at the central office desires to transmit a message to the typical train station shown in Fig. 4 from among the different train stations that may be within range. To do this, the operator actuates the talk button 3TB which immediately energizes the repeater relay 3TBP. This repeater relay 3TBP besides rendering the microphone 3MK effective through front contact 108, also closes front contact 109 to prepare a pick-up and stick circuit for relay 3SCP for reasons later explained. It will be observed that the mere operation of the talk button 2TB itself does not change the status of the radio transmitter and receiver, but merely prepares the system for operation which may be either of the selective talking character or may be in the nature of a general call to all of the mobile train stations. In the present case, it is assumed that the operator desires to send a message to a selected station so that immediately following the actuation of the talk button 3TB, he actuates the typical code calling key corresponding to the desired station. The initial movement of the code calling key dial energizes the relay 3SC, by reason of the contact 110 coming in contact with the code wheel, and this energized condition of the relay 3SC is maintained throughout the complete operation of the code wheel. This same relay 3SC would, of course, be energized in a similar manner regardless of the particular code calling key operated.

The picking up of relay 3SC closes an energizing circuit for the relay 3SCP from (+), and including front contact 109 of relay 3TBP, front contact 111 of relay 3SC, windings of relay 3SCP, to (−). The closure of front contact 114 of relay 3SCP acts to shunt contact 111 to thereby complete a stick circuit to maintain it energized dependent upon the actuation of the talk button even after the code call has been transmitted and relay 3SC becomes deenergized. This operation is indicated in the sequence chart of Fig. 9, and shows the same code as employed for the typical illustration in connection with Fig. 1 and its sequence chart of Fig. 6, the only difference being that the code elements in the present form of the invention are constituted by tone pulses and spaces instead of by carrier pulses and spaces. The picking up of relay 3SC also opens its back contact 112 to prevent illumination of the talk lamp 3TK until the operation of the code calling key has been completed.

Also, the picking up of relay 3SCP completes an energizing circuit for the transmit relay 3TR from (+), and including front contact 124 of relay 3TBP, front contact 116 of relay 3SCP, back contact 107 of relay 3CR, windings of relay 3TR, to (−). At the same time a circuit is closed for the tone generator including back contact 117 of relay 3CP, back contact 118 of relay 3CAP, and front contact 119 of relay 3SCP, to ground. Thus, the initial actuation of the code calling key following the actuation of the talk button 3TB effects the rendering inactive of the radio receiver and the rendering active of the radio transmitter with the tone generator also effective to modulate the radio frequency carrier signal with its distinctive tone frequency, as indicated in the sequence chart of Fig. 9.

During this time, operation of the code calling key is, of course, in progress so that as the code wheel operates in its counterclockwise direction, the contact 110 is so operated as to intermittently energize the code repeating relay 3CP in accordance with the code call of the desired station (see Fig. 9A). This intermittently opens back contact 117 to cause the distinctive tone frequency superimposed on the radio frequency carrier to be pulsed in accordance with the code call of the station to be selected. For convenience, the same code is assumed for this typical code key, as already described for Fig. 1.

Since the energizing circuit for the transmit relay 3TR is steadily closed by the circuit above described, it is apparent that the operation of the coding contact 100 is ineffective to act upon the transmit relay 3TR. At the end of the code transmitting operation as provided by the code calling key, the relay 3CP remains deenergized so that a steady distinctive tone is maintained upon the radio carrier signal. Also, the relay 3SC is deenergized opening front contact 111 but this does not effect the release of relay 3SCP since it is provided with a stick circuit including front contact 114, which remains closed so long as the talk button 3TB is actuated. When relay 3SC is released, a circuit is completed for the talk lamp 3TK from (+), and including back contact 112 of relay 3SC, front contact 120 of relay 3SCP, front contact 121 of transmit relay 3TR, lamp 3TK, to (−). In other words, the talk lamp 3TK is illuminated as soon as the selecting code has been completed advising the operator that he may speak into the microphone 3MK and transmit the desired message. The microphone 3MK is now rendered effective by reason of the closure of back contact 122 of relay 3SC to complete the circuit of the microphone which also includes front contact 108 of the relay 3TBP.

The voice message transmitted may be as long as necessary since the continued actuation of the talk button maintains the central office in control of the communication channel. If to supplement the voice message or in place of the voice message the operator so desires, he may transmit a facsimile message merely by the actuation of the lever 3FT to its left-hand position. This causes the operation of the facsimile transmitter to superimpose suitable tone frequencies upon the radio carrier frequency to effect the transmission of a typewritten page, photograph, or the like in the usual well known manner. At the completion of all message transmission, the central office is restored to its normal condition in due course merely by release of the talk button 3TB. This self-restoring push button 3TB, of course, opens the circuit for its repeater 3TBP which in turn opens the stick circuit for the relay 3SCP and deenergizes the transmit relay 3TR restoring the apparatus to its normal condition in which the transmit relay 3TR is intermittently operated by the coding contact 100 as previously described.

However, it is often desirable for the operator at the central office when calling a particular station to receive an acknowledgment from that station before actually transmitting the message intended for that station. In other cases it may be necessary to transmit messages in opposite directions several times before a complete understanding of a situation is established. For these reasons the present invention provides that if the operator does not wish to transmit his message immediately following a selection, he can merely ask for an acknowledgment and assure himself that the communication channel is established before transmitting his message. This is accomplished without any additional transmission of selecting codes providing the shift in direction of transmission is accomplished within a predetermined time conveniently termed the clear-out period.

At the office, the transmission of a selecting code and any message thereafter effects the energization of a clear-out timing relay by reason of the closure of a circuit from (+) and including front contact 109 of relay 3TBP, back contact 130 of relay 3CAP, front contact 129 of relay 3TR, windings of relay 3CTM, to (−). The picking up of this timing relay 3CTM opens its back contact 125 at the beginning of a transmission from the central office to deenergize the clear-out indicator 3COK, which condition is maintained for a predetermined time after the release of the button repeating relay 3TBP. So long as the clear-out lamp 3COK is not illuminated, the operator is advised against initiating a new selecting operation, but during such time a train station may reply and maintain not only his own selection but also the energized condition of the timing relay 3CTM by reason of the closure of front contact 115 of relay 3TN in a manner later described. This energization of the clear-out timing relay 3CTM provides that transmission may be effected from the office within a limited time following a reception without the actuation of a code calling key in a manner which will be described later, it being sufficient for the present to note that during the initial transmission from the central office that the conditions for clear-out indications and for establishing two-way transmission without further selective operations is effected. This hold over operation of the relay 3CTM is indicated in Fig. 9A but before considering the manner in which a reversal in the direction of transmission is effected, it is convenient to consider how a typical train station is selected.

*Selection of train station.*—The reception of a steady carrier signal maintains the carrier responsive relay CR at each train station picked up which after a short interval of time releases the back contact repeater relay BP at each of the train stations. For example, at the typical train station of Fig. 4, the release of the back contact repeater relay 4BP, opens its contacts 210 and 211 to uncover or render responsive the loud speaker 4LS and the facsimile recorder. However, since this steady carrier at the beginning of a code call also includes the distinctive tone frequency, the tone responsive relay TN, at each train station is also picked up which causes the immediate energization of its repeater relay SA to render ineffective the loud speaker and facsimile recorder at each station. For example, at the typical train station of Fig. 4, the picking up of the relay 4TN closes front contact 207 to energize relay 4SA. This energization of relay 4SA closes front contacts 212 and 213 to shunt the loudspeaker and facsimile recorder. Since the relay 4SA picks up more rapidly than the relay 4BP releases, it is apparent that the loud speaker 4LS will be shunted through front contact 212 of relay 4SA and back contact 214 of relay 4SR, before the front contact 210 of relay 4BP is open (see sequence chart of Fig. 9). Likewise, the facsimile recorder will be shunted through front contact 213 of relay 4SA and back contact 215 of relay 4SR before the front contact 211 of relay 4BP is opened. In this way, the reception of the carrier frequency signal with a distinctive tone thereon causes the loud-speaker and facsimile recorder to be maintained unresponsive or inactive at all of the train stations during a selective calling operation.

When the distinctive tone frequency is interrupted in accordance with the distinctive code call for a particular desired station, the tone responsive relay TN at each of the mobile stations is caused to repeat such code call. This operation of the tone responsive relays TN causes their respective selectors to be operated, but the selector contact, such as contact 216 of Fig. 4, will become closed at only one of the several stations for reasons previously explained in detail in connection with Fig. 2. Assuming that the typical train station of Fig. 4 is the one selected, then the selector contact 216 is closed when the last "off" of the code call is received (see Fig. 9). Thus, a circuit is closed for the selector relay 4SR from (+), and including front contact 217 of tone responsive relay 4TN, selector contact 216, windings of relay 4SR, to (−). The picking up of the contact 218 of relay 4SR completes a stick circuit to shunt contact 216, so that the restoration of the selector contact does not release the selector relay.

As above mentioned, the relay 4SA picks up prior to the release of the relay 4BP so that the check light 4CK at each of the mobile stations is maintained illuminated by reason of a circuit typically shown in Fig. 4 as including back contact 219 of relay 4SR and front contact 220 of relay 4SA. This circuit is maintained at all of the stations except the selected station throughout the selective communication which is being established. At the selected station, such as the typical station of Fig. 4, the picking up of the selector relay 4SR opens back contact 219 causing the check lamp 4CK at such station to be deenergized together with the deenergization of the bell B. This indicates to the operator that he should receive a message, and in the absence of such a message he will be advised that the communication facilitates have failed.

Also, at the selected station, assumed to be the station of Fig. 4, the opening of back contacts 214 and 215 of relay 4SR renders the speaker 4LS responsive and the facsimile recorder also in condition for the reception of a message. If a voice message is received, it will be reproduced by the loud speaker 4LS. If the message is a facsimile message, then it will act upon the facsimile recorder giving the operator a copy of the typewritten sheet, photograph, or the like, as the case may be.

Throughout the time that the central office is transmitting, the busy lamp BK at each of the mobile stations is maintained illuminated. For example, the release of the relay 4BP completes a circuit for the busy lamp 4BK from (+) and including front contact 203 of relay 4FP, back contact 204 of relay 4BP, lamp 4BK, to (—).

So long as the central office transmits a carrier frequency with the superimposed distinctive tone, both the carrier and tone responsive relays CR and TN are held energized at the several stations. This prevents the various non-selected stations as well as the selected station from endeavoring to interfere with the transmission then in progress over the communication channel. For example, back contact 222 of relay 4CR prevents any possible energization of the transmit relay 4TR by the actuation of the talk button 4TB and the closure of back contact 223. As a matter of fact, at the selected station the selector relay, such as relay 4SR, closes front contact 224 to apply (+) to the wire 225 so that the operator at such station can immediately actuate the talk button 4TB and energize the transmit relay 4TR at the end of a message received from the central office. At the non-selected stations where the selector relays are not picked up, the slow acting tone repeating relays, such as relay 4SA, are picked up opening back contacts 226 so that such stations cannot effect transmission until after the predetermined time measured by the release of the repeater relays SA. At the selected station, the relay 4SA closes its front contact 226 to maintain the selector relay 4SR energized through an auxiliary stick circuit even though the tone responsive relay 4TN ceases to be energized at the end of message reception from the central office.

In other words, if the operator at the selected station desires to reply to the central office, he may do so immediately following a message from the office, the termination of which is indicated by the extinguishment of the busy lamp 4BK, whereas the non-selected stations cannot break into the communication channel for a predetermined time measured by the release of the relays SA. This is indicated at all stations by the unilluminated condition of the clear-out lamps. If the selected station initiates transmission within the limited time, the non-selected stations are maintained locked out. This feature is provided so that two-way communication may be held between the central office and a selected station to the exclusion of other stations. If no reply message is intended by the mobile station, then the system restores to its normal condition after a limited time measured by the release of the slow-acting repeater relays (relay 3CTM at the central office and relay SA at each of the mobile stations).

The release of the relay 3SCP at the central office upon release of the talk button removes steady energy from the transmit relay so that the check pulses are immediately initiated and the check lights are restored at each of the mobile stations. In this connection, it might be noted that the check light 4CK is immediately restored at the selected station, since the termination of a message results in the immediate release of the relay 4CR which picks up the relay 4BP to immediately complete the circuit for the check lamp 4CK at front contact 204 (see chart of Fig. 9). The time of deenergization of the relay 4CR before the reception of a check pulse will be no greater than the usual time depending upon the point in the cycle of the coding contact 100. On the other hand, if a suitable synchronized coder is employed, such as shown in the prior patent to N. D. Preston, Pat No. 2,408,878, dated October 8, 1946, in which the code oscillator or check pulse transmitter at the central station is caused to start from a particular point following each message transmission, then the space following each message before the first check pulse will always be the same as the space between any two successive check pulses.

*Two-way communication with selected station.*—Let us assume that the operator at the mobile train station of Fig. 4 desires to acknowledge the message just transmitted from the central office, and that he actuates the talk button 4TB within the predetermined time measured by the release time of the slow-acting tone repeaters, such as relay 4SA. The transmit relay 4TR is immediately energized by reason of a circuit closed from (+) and including front contact 224, wire 225, back contact 222 of relay 4CR, operated contact 223 of talk button 4TB, windings of transmit relay 4TR, to (—). This energization of the transmit relay 4TR immediately renders the radio receiver inactive and the radio transmitter active for transmitting a radio carrier signal having superimposed thereon the distinctive tone, since the associated tone generator is effective by reason of the closed condition of contact 227 of the self-restoring push button 4CA. Since the radio transmitter is immediately rendered active by the picking up of the transmit relay 4TR, the operator may at once speak into the microphone to transmit his message or acknowledgment of selection. This condition is indicated by the illumination of the talk lamp 4TK, which is energized through front contact 231 as soon as the transmit relay 4TR is picked up.

At each of the non-selected mobile stations, the carrier responsive relay CR opens a contact, such as back contact 222 of relay 4CR in Fig. 4, but the transmit relay at such a non-selected station could not be energized by actuation of the talk button even before the contact 222 opened because the time measured by the release of the slow release relay SA had not elapsed. Also, the reception of the distinctive tone on the radio carrier frequency acts at each of the non-selected stations to pick up the tone responsive relay TN, such as relay 4TN of Fig. 4, which occurs prior to the release of the slow release repeater relay 4SA. This maintains the slow release repeater relays picked up at all non-selected stations and continues both to mute their loud-speakers and facsimile recorders and to maintain such stations locked out. The picking up of the carrier responsive relay again releases its back contact repeater and thus illuminates the busy lamp BK, but each of the non-selected stations are advised that no transmission from that station should be initiated by reason of the continued unilluminated condition of the clear-out lamp COK.

At the selected station the transmit relay 4TR in picking up energizes the repeater relay 4TRP through a circuit closed from (+), and including front contact 228 of relay 4TR, button contact 229, windings of relay 4TRP, to (−). The energization of this slow release repeater relay 4TRP causes its contacts to immediately pick up, so that its front contact 230 closes an energizing circuit for the selector relay 4SR before the relay 4SA can drop away. Thus, the selector relay 4SR is maintained energized even though the message from this selected station continues for a length of time greater than that required for the relay 4SA to drop away. For this reason, the selection is maintained regardless of the length of message transmitted from this station. It might also be noted that the picking up of relay 4TRP opens back contact 221 included in the circuit for the clear-out lamp 4COK. Since the carrier responsive relay 4CR remains deenergized at the selected station, back contact 202 is closed for energizing the back contact repeater relay 4BP which causes the busy lamp 4BK to be deenergized at open back contact 204. Also, the closure of front contact 204 energizes the check lamp 4CK at this time (see sequence chart of Fig. 9).

At the central office, the picking up of the carrier responsive relay 3CR opens back contact 107 so that the transmit relay 3TR cannot be energized, i. e. the central office is locked out. This locking out of the central office not only prevents the operator at the central office from initiating transmission, but also serves to prevent the transmission of check pulses which would otherwise interfere with transmission by the selected station. The closure of front contact 126 of the relay 3CR energizes the busy lamp 3BK advising the central office operator of the busy condition of the communication channel. Since the radio carrier frequency has superimposed thereon the distinctive tone, the tone responsive relay 3TN is picked up opening back contact 123 to unshunt the loud-speaker 3LS so that it can reproduce any voice message received. This energization of the tone responsive relay 3TN also closes front contact 115 which energizes the slow release relay 3CTM before it has fully released (see sequence chart of Fig. 9). In other words, the transmission from the selected station has effected a shift in the direction of transmission within a period of time shorter than the time required for a clear-out operation of the system. This shift period may vary from its minimum time (i. e. the time required if the operator at the selected train station actuates the talk button as quickly as possible after the extinguishment of the busy lamp 4BK) to a maximum time not exceeding the length of the clear-out period as indicated by the release of the slow-acting relays SA at the different field stations and the relay 3CTM at the central office. In this it is possible for the selected station to communicate with the central office over the communication channel to the exclusion of all other train stations.

Figures 8A, 8B, 8C, 8D, 8E, 8F:
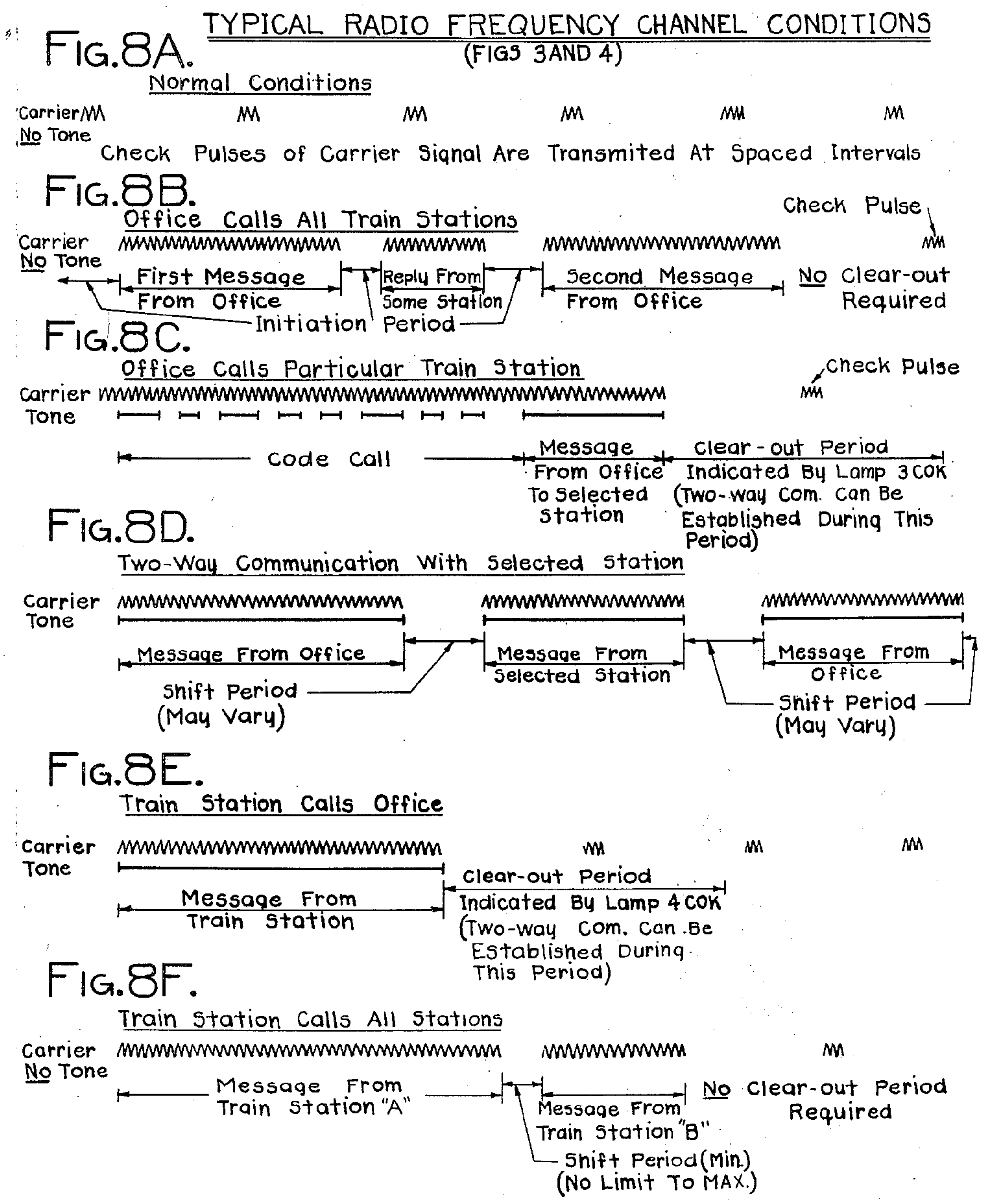

With reference to Fig. 8C, a diagram is shown indicating that the original selecting message from the central office may be for selecting a particular train station and that such message may end with a clear-out period. It is also indicated by suitable legend that the two-way communication can be established, which is effected as above described and this two-way communication has been indicated in the diagram of Fig. 8D.

As shown in Figs. 9A and 9B, the two-way communication indicates the usual type of call where the central office first transmits the selecting code call and request for acknowledgment, which acknowledgment is made by the selected train station followed by the message from the office. This two-way communication can, however, be carried on as long as desired or it can be terminated at any time by merely the cessation of transmission from either the office or the selected station. But in order to know how the office can reply with its message without the use of further selecting code calls, it is considered expedient to discuss such a shift period, as contrasted with the shift period above described and shown in the sequence chart of Fig. 9A.

Let us assume that the selected train station transmits its acknowledgment of selection to the central office and that the central office desires to then transmit a message of any desired length. This is effected by the central office operator actuating his talk button 3TB as soon as the busy lamp 3BK is extinguished, or at least within a sufficiently short time to accomplish the shift in direction of transmission before a time has elapsed corresponding to a clear-out period. The picking up of the button repeating relay 3TBP energizes the relay 3SCP by reason of a circuit closed from (+) and including front contact 109 of relay 3TBP, front contact 113 of the slow release clear-out timing relay 3CTM, windings of relay 3SCP, to (−). As soon as relay 3SCP picks up, a circuit is closed for the transmit relay from (+) and including front contact 124 of relay 3TBP, front contact 116 of relay 3SCP, back contact 107 of relay 3CR, windings of transmit relay 3TR, to (−).

Since the transmit relay 3TR picks up before the clear-out period time has elapsed the relay 3CTM is energized before its contacts release by reason of a circuit closed from (+) and including front contact 109 of relay 3TBP, back contact 130 of relay 3CAP, front contact 129 of relay 3TR, windings of relay 3CTM, to (−). From this it can be seen that the transmit relay can be energized directly as a result of the actuation of the talk button without the actuation of a code calling key so long as the clear-out timing relay 3CTM is picked up closing front contact 113. If the operator at the central office waits until the release of the clear-out timing relay, then another selecting code call must be transmitted. As soon as the transmit relay 3TR is picked up, the talk lamp 3TK is energized through a circuit including back contact 112 of relay 3SC and front contacts 120 and 121.

At the selected station, the reception of the carrier frequency with its distinctive tone is, of course, repeated by relays 4CR and 4TN. The picking up of the relay 4CR opens back contact 222 to lock out the selected station and releases the relay 4BP to close back contact 204 to energize the busy lamp 4BK for indicating this condition. Also, the opening of front contact 204 extinguishes the check lamp 4CK advising the operator at the selected station that he should receive a message. The picking up of the tone responsive relay 4TN closes front contact 207 to energize the relay 4SA. The closure of front contact 217 completes the stick circuit for the selector relay 4SR before the slow-release relay 4TRP drops away. In this way the selector relay 4SR is maintained picked-up during the shift period for the change in direction of transmission. The selector relay being picked up and opening back contacts 214 and 215 permits the reception of the voice and/or facsimile message from the central office.

At the other non-selected stations, the slow repeater relays such as relay 4SA of Fig. 4, have not had time to release during the shift-over so that the reception of the carrier signal with the distinctive tone maintains such relays picked up and thus maintains such stations muted because their selector relays, such as relay 4SR of Fig. 4, are not picked up.

In this way the central office and any selected mobile station can carry on two-way communication which will be exclusive with respect to the other mobile stations, i. e. the other mobile stations will neither hear the messages, nor will they be able to break in upon the communication channel.

As indicated in the diagram of Fig. 9, the two-way communication ends with the cessation of transmission from the office. At each of the stations and the office the clear-out lamp will be illuminated after an elapse of the clear-out period thus advising the operators that any new transmission may be initiated. It might be noted that in this case the timing operations at the stations for the clear-out period involve the slow release relays SA, but if the termination of the two-way communication should be by the selected field station, then the measuring of the clear-out period at that station would be by the slow release relay 4TRP as indicated in the sequence chart of Fig. 10 for a different calling condition. In any event, the cessation of transmission allows the check pulses to be transmitted from the central office and one or more of these pulses may be transmitted during the clear-out period so as to maintain both the relays FP and BP energized at all stations to maintain the back lamps CK illuminated since there is no message to be received at this time.

*Office calls all train stations.*—In the event that the operator at the central office has a message which he desires to transmit to all of the mobile train stations, he can eliminate necessity for transmitting a selecting code call by actuating the push button 3CA following the actuation of the talk button 3TB. These manual operations on the part of the central office operator result in the transmission of a radio carrier signal upon which there is no distinctive tone superimposed. Such a radio carrier signal received at the various train stations results in unshunting the loudspeakers and facsimile recorders so that all stations are in readiness to receive messages from the central office without the transmission of any code call whatsoever. This condition has been indicated generally in the diagram of Fig. 8B where it is seen that the carrier is transmitted without a distinctive tone and that successive messages either from the office or from some train station may be transmitted without requiring an intervening clear-out period.

More specifically, the actuation of the talk button 3TB energizes its repeater relay 3TBP. The closure of front contact 108 conditions the microphone for operation but the transmit relay cannot be picked up nor can the relay 3SCP by mere operation of the talk button. But the actuation of the button 3CA closes an energizing circuit for the relay 3CAP from (+) and including front contact 109 of relay 3TBP, button 3CA in an operated position, windings of relay 3CAP, to (−). As soon as contacts of the relay 3CAP have operated, its front contact 130 creates a stick circuit shunting the button contact 3CA so that the operator is not required to continue holding the button 3CA. The closure of front contact 127 of relay 3CAP completes an energizing circuit for the transmit relay from (+) and including front contact 124 of relay 3TBP, front contact 127 of relay 3CAP, back contact 107 of relay 3CR, windings of relay 3TR, to (−). This renders the radio receiver inactive and the radio transmitter active for transmission which is indicated by the illumination of the talk lamp 3TK. Under these circumstances the talk lamp is energized from (+), through a circuit including front contact 128 of relay 3CAP, front contact 121 of relay 3TR, indicator lamp 3TK, to (−).

It will be noted that the operator can immediately transmit his message and this message is not accompanied by the distinctive tone by reason of the fact that back contact 118 of relay 3CAP is open rendering the tone generator ineffective.

At the various mobile train stations, the reception of a radio frequency carrier signal without the distinctive tone causes the carrier responsive relays CR to be picked up, and their respective back contact repeater relays BP, such as relay 4BP of Fig. 4, to be deenergized. Referring to Fig. 4 it will be obvious that this renders the associated loud-speaker and facsimile recorder effective for the reproduction of any message received and the busy lamp 4BK is illuminated. The message transmitted by the central office may be a voice message spoken into the microphone 3MK, or a facsimile message transmitted during the closure of the lever 3FT.

It will be noted that the release of the back contact repeater relays causes the check lights at all stations to become unilluminated. Also, the clear-out lamp at all stations will remain lighted since the slow release relays SA are not picked up nor is any selector relay SR picked up under these circumstances. In the event that any train station fails to receive a message during the time that its check lamp is extinguished, the operator at such station will be advised that there is a failure in the communication system.

At the end of the transmission from the central office, the release of the talk button 3TB restores the relay 3CAP and deenergizes the transmit relay 3TR. Since the clear-out lamp 3COK has remained illuminated and the timing relay 3CTM has not been energized, there is no restrictive clear-out period required so that a succeeding message may be transmitted by the central office to all stations or to some particular station in the usual way. On the other hand, if some train station wishes to report to the central office, it can do so as soon as its busy lamp becomes extinguished without waiting for any clear-out period since the relays SA have not been energized and their clear-out lamps COK have remained illuminated.

*Train station calls central office.*—When the operator at any train station desires to communicate with the central office, he observes that the associated busy lamp BK is not illuminated and that the clear-out lamp at such station is illuminated. He then actuates the talk button to initiate operation of his station in such a way as to establish communication with the central office to the exclusion of the other train stations. Generally speaking, this is effected by the train station transmitting a radio frequency carrier signal accompanied by the distinctive tone supplied by its associated tone generator as indicated in the diagram of Fig. 8E. This distinctive tone accompanying the carrier signal results in maintaining muted the loud-speaker at each of the other stations but renders the central office effective for receiving. Under this condition, the train station effecting the call to the office is so acted upon as to establish in the same condition as if it had been selected by the office which permits the establishment of two-way communication with the office to the exclusion of the other train stations without in any way requiring the transmission of selected code calls. In this connection it should be noted, however, that each communication thus established regardless of whether it is a single transmission to the office or whether it becomes two-way communication, must be followed by a clear-out period before some new communication is initiated by the office or the same train station or some other train station.

More specifically, the actuation of the talk button 4TB for the typical train station of Fig. 4, for example, closes its back point 232 to maintain energized relay 4FP, while the carrier responsive relay 4CR is not receiving check pulses during transmission from this station. Obviously, the continued closure of back contact 202 maintains the back contact repeater relay 4BP energized. Thus, the check lamp 4CK is maintained illuminated under the conditions when the station transmits to the central office. The closure of back contact 223 completes the energizing circuit for the transmit relay 4TR since back contacts 222 and 226 are closed. This immediate energization of the transmit relay 4TR renders the radio receiver inactive and the radio transmitter active which is indicated to the operator by the immediate illumination of the talk lamp 4TK. This transmission of a carrier signal by the train station is accompanied by the distinctive tone since its tone generator is effective at all times except when the button 4CA is actuated (see Fig. 10 for sequence of operations).

The reception of the carrier signal with the distinctive tone at each of the other stations acts to maintain energized the front contact repeater relay and the slow acting tone repeater relays. The check lamps at these various other stations are thus maintained energized by reason of a circuit closed through a back contact 219 of the selector relay and a front contact 220 of the slow acting repeater relay which is closed prior to the release of the back contact repeater relay BP at such a station. The busy lamp BK at each such station is also illuminated by reason of the closure of back contact 204 of its back contact repeating relay. Each of these other mobile stations are prevented from receiving since the picking up of the slow acting tone repeating relays SA completes shunt circuits for the loud-speaker and facsimile recorder which shunt circuits are maintained because the selector relays SR remain deenergized.

At the office the reception of the carrier frequency energizes the relay 3CR which prevents not only the transmission by the operator at the central office, but also prevents the transmission of the check pulses. The closure of front contact 126 causes the illumination of the busy lamp 3BK advising the operator of this condition. The reception of the tone at the office causes the relay 3TN to be picked up opening back contact 123 to allow the reproduction of any message received. The closure of front contact 115 energizes the clear-out timing relay 3CTM so that the clear-out indicator 3COK becomes unilluminated.

It should be noted that the picking up of the transmit relay 4TR at a particular station transmitting, causes its repeater relay 4TRP to be energized which in turn causes the energization of the selector relay 4SR in a manner previously described. This opens back contact 219 at the sending station so that the clear-out indicator 4COK becomes unilluminated but since both the relay 4FP and 4BP are energized at this station the check lamp 4CK remains lighted.

At the other stations where the selector relays are not picked up, the opening of the back contact 220 of their slow acting back contact repeater relays causes their clear-out lamps to be deenergized.

When this calling train station has transmitted its message, the system can go through a clear-out period and be restored to normal conditions permitting the initiation of another transmission, or two-way communication can be established at any time within the limits of the clear-out period. This has been indicated by a suitable legend in the diagram of Fig. 8E.

Since the conditions at the office and at the train stations established under this condition are the same as when a selected train station is transmitting to the office in the two-way communication described above, it is believed to be unnecessary to go into detail as to various sequences involved. It is believed sufficient to point out that since the clear-out timing relay 3CTM is picked up at the central office, the central office operator may respond during its release time by actuating his talk button to energize the relay 3SCP and the transmit relay 3TR. Similarly, at each of the stations the clear-out time is measured by the release of the SA relays whereas at the calling train station, assumed to be one shown in Fig. 4, the clear-out time is measured by the release of the relay 4TRP. Thus referring to Fig. 10 which shows a sequence chart for a call by a train station, acknowledgment by the office, and transmission of a message by the train station, it is believed that it will be readily apparent how the different relays will assume their positions and permit two-way communication to be established and to be effective so long as the shift in direction of transmission is accomplished during a limited shift period which may not exceed the clear-out period. Following the two-way transmission which may be established under these conditions it will be noted that the check pulses are transmitted in the usual way.

In this way any mobile station may initiate communication with the central office which will permit the establishment of two-way communication to the exclusion of the other mobile stations without the necessity of using a code call or the simulation of a code call as required in connection with the previously described form of the present invention.

*Train station call all train stations.*—If the operator at any particular mobile train station desires to talk with any other train station or all other train stations, he may do so by actuating the talk button 4TB together with the button 4CA. Generally speaking, the effect of this dual actuation of the buttons is to cause the transmission of a radio carrier signal without the distinctive tone. This operates the same as in the situation explained in connection with the transmission to all stations by the central office, to lock out the central office and all other train stations but the messages thus transmitted will be received by the train stations and any one of them may reply to it.

At the central office, however, the message will not be reproduced because the loud-speaker 3LS is shunted or otherwise rendered ineffective under these conditions when no tone is received. However, special provisions are provided for monitoring such communication whenever the operator at the central office so desires. In other words, the actuation of the monitoring button 3MB opens the shunt circuit associated with the loud-speaker 3LS and permits the message to be received. The picking up of the carrier relay 3CR closes front contact 126 energizing the busy lamp 3BK indicating to the operator that the communication channel is busy. The picking up of the carrier responsive relay 3CR also prevents the transmission of check pulses from the central office so as to not interfere with the transmission from the particular train station.

The reception of the carrier signal at each of the other train stations causes their carrier responsive relays to be picked up which in turn releases their back contact repeater relays to cause the deenergization of their check lamps and the lighting of their busy lamps. It might be noted that the clear-out lamps are not extinguished either at the office or at any of the train stations under the present conditions of communication. Thus, as soon as the operator at the particular transmitting station ceases transmission, the system restores to its normal conditions without the necessity of a clear-out period, so that any train station or the office may initiate a transmission as soon as their busy lamps become unilluminated. This is indicated in Fig. 8F where the diagram suggests that successive messages may follow each other without a clear-out period and that at the end of such successive messages no clear-out period is required, but the check pulses are applied in the usual way to cause the restoration of the check lights to their normally illuminated condition.

It will be noted at the particular station transmitting, assumed to be the typical train station of Fig. 4, the opening of contact 229 of the button 4CA prevents the energization of the relay 4TRP when the transmit relay 4TR is picked up. This is so that this slow release relay 4TRP will not open back contact 221 and deenergize the clear-out lamp 4 COK and also so that the selector relay 4SR will not be picked up. In other words, the conditions established during the communication between any one train station and all others is similar to the conditions established when the office calls all train stations and the train stations are so organized as to prevent any simulation of a selected condition as is required when a train station calls the office.

*General characteristics.*—Referring to Fig. 4, as well as to the sequence charts of Figs. 9A, 9B and 10, it will be seen that the front contact repeater relays FP do not drop away under the usual conditions of transmission established as above described. As a matter of fact, these relays are maintained energized continuously so long as the system properly operates, but in the event of the failure of the office to transmit check pulses, these relays, such as relay 4FP, would be released opening their contacts 203 to cause the extinguishment of the associated check lamps CK. Similarly, a failure in the radio receiver of the typical station, or a failure in the front contact 202, would cause the relay 4FP to drop away and result in the extinguishment of the check lamp 4CK. In other words, these front contact repeater relays are provided for the purpose of causing the check lamps to be illuminated only providing the system is in an operative condition. Such a checking feature is organized on the basis of failure on the side of safety.

The selective talking organization is so arranged that in the event of its failure to properly select a station, which can easily be brought to the attention of the central office operator by failure of that station to acknowledge a call, the central office operator can omit all operation of the selective portions of the system and call all stations including the desired station. Thus, the message he has for transmission can be effectively transmitted to the desired station even though its selector apparatus fails to properly function.

It should be understood in considering the different sequences of operations that various timing characteristics for the relays can be selected and that the sequence charts have been provided merely for the purpose of giving one example of sequences and more clearly indicating the operation intended for the organization disclosed. It should also be understood that various modifications may be provided involving the combining of functions and relays in different cases so as to simplify the amount of apparatus employed. Also certain features may be omitted and others retained. For example, if it is unnecessary to mute the loud-speakers under normal conditions when check pulses are being received, it is apparent that the contacts 210 and 211 may be omitted without sacrificing any of the selective two-way talking features of the present invention.

Having thus described two forms of a radio communication system as specific embodiments of the present invention, it is desired to be understood that these forms are selected to facilitate in the disclosure of the invention rather than to limit the number of forms which it may assume; and, it is to be further understood that various modifications, adaptations and alterations may be applied to the specific forms shown to meet the requirements of practice, without in any manner departing from the spirit or scope of the present invention except as limited by the appended claims.

What we claim is:

1. In a radio communication system for providing selective communication between a central office and any one of a plurality of secondary stations, a transmitter and a receiver operating on the same carrier frequency at said central office and at each of said secondary stations, manually operable means at the central office for rendering its transmitter active to radiate a carrier frequency modulated by a message and with or without a distinctive controlling condition of the carrier frequency including for a time any one of a plurality of distinctive selector codes belonging to the different secondary stations, said manually operable means being ineffective when its associated receiver is receiving a carrier signal message receiving means at each secondary station normally operating in response to its associated receiver, suppressing means at each secondary station responsive only to said distinctive controlling condition of the carrier frequency for suppressing operation of the associated message receiving means, and a selector at each secondary station effectively operated only by the selector code allotted to that station for rendering its message receiving means responsive to its associated receiver independently of the associated suppressing means.

2. In a radio communication system for providing selective communication between a central office and any one of a plurality of secondary stations, a radio transmitter at said central office and a radio receiver at each of said secondary stations operable on the same carrier frequency, manually operable means at the central office for rendering its radio transmitter active to radiate a carrier frequency signal for at times transmitting a distinctive controlling condition and a selecting code followed by a modulating message and for at other times transmitting a modulating message alone, message reproducing means at each of said secondary stations normally responsive to the associated radio receiver for reproducing any message modulating a received carrier frequency signal, suppressing means at each secondary station rendered active by its associated receiver in response to the reception of said controlling condition for suppressing the operation of said message reproducing means, and a code responsive means at each secondary station governed by its associated radio receiver and effectively operated only upon the reception of a code allotted to that station for rendering its message reproducing means responsive to its associated radio receiver regardless of the active condition of said suppressing means for that station, whereby transmission of a selecting code for a desired station effects an exclusive communication with the desired secondary station while transmission of a modulating message without the distinctive controlling condition and a selective code effects communication with all secondary stations.

3. In a radio communication system for providing selective communication between a central office and any one of a plurality of secondary stations, a radio transmitter at the central office and a radio receiver at each of the secondary stations operable on the same carrier frequency as said transmitter, manually operable means at the central office for initiating operation of its transmitter to radiate a carrier frequency signal adapted to be modulated by a message, other manually initiated means for causing said transmitter to intermittently interrupt its carrier signal in accordance with any one of a plurality of distinctive selector codes belonging to the different secondary stations, message reproducing means at each of said secondary stations normally effective to reproduce any message modulating the carrier signal received by its associated radio receiver, suppressing means at each secondary station responsive to a momentary interruption of a carrier frequency signal for suppressing operation of the associated message reproducing means, and a code responsive selector at each secondary station governed by the associated radio receiver so as to be effectively operated only by the interruptions of a received carrier signal in accordance with the code allotted to that station for rendering its associated message reproducing means responsive to its associated radio receiver independently of the operated condition of the associated suppressing means, whereby the initiation of the operation of the radio transmitter at the office followed by a modulating message causes reception of that message by all secondary stations while the initiation of the operation of the transmitter at the office followed by the transmission of a selecting code for a particular station and a modulating message in that order causes reception of the message at only said particular secondary station.

4. In a radio communication system for establishing selective communication with any one of a plurality of vehicles, equipment on each vehicle comprising, a radio receiver and a loud-speaker operated thereby, a tone relay governed by said receiver and energized only by the reception of an inaudible tone super-imposed on the radio carrier frequency, a circuit for governing the response of said loud-speaker and effective to prevent its operation only when said tone relay is energized, a selector for closing contacts only when said tone relay is intermittently energized in accordance with a particular code call allotted to that selector, and means initially energized by the closure of said selector contacts and maintained energized so long as said tone relay is energized for governing said circuit to render said loud-speaker effective, regardless of the energized condition of said tone relay.

5. In a vehicle equipment for a radio communication system providing selected communication with any one of a plurality of vehicles comprising, a radio receiver and message receiving means normally operated thereby, a tone relay governed by said receiver and energized only by an inaudible tone frequency superimposed on the radio carrier frequency for suppressing operation of said message receiving means, and a selector device effectively operated only when said tone relay is intermittently energized in accordance with a particular selector code call to render said message receiving means effective independently of the energized condition of said tone relay so long as said tone frequency is being received, whereby the message receiving means is operated when the tone frequency is controlled in accordance with a particular code call or when a carrier frequency without said tone frequency is received.

6. In a radio communication system for establishing selective communication with any one of a plurality of vehicles, equipment on each vehicle comprising a radio receiver and a loudspeaker operated thereby, a circuit for governing the response of said loud-speaker, a tone relay governed by said receiver and energized only by the reception of a tone superimposed on the radio carrier frequency, means including a slow acting relay controlled by a steady or intermittent operation of said tone relay for governing said circuit to render said loud-speaker ineffective, a selector of the self-restoring type for temporarily closing said contacts only when said tone relay is intermittently energized and deenergized in accordance with a particular code call allotted to that selector, and means including a stick relay initially energized by the temporary closure of said selector contacts and maintained energized so long as said tone relay is energized for governing said circuit to render said loud-speaker effective regardless of the control of said slow acting relay.

7. In a radio communication system for providing selective communication from a fixed station to any one of a plurality of vehicles, a radio transmitter at the fixed station, manually operable means at the fixed station for rendering its transmitter active to send out carrier frequency modulated by a message together with an inaudible tone frequency, selective calling means at the fixed station manually operable to interrupt said tone frequency for a calling period in accordance with any one of a plurality of different code calls belonging to different vehicles, radio receiving means on each vehicle including a tone relay energized only by the reception of a carrier frequency modulated by said tone frequency, message reproducing means on each vehicle normally operable by a received message, muting circuit means on each vehicle responsive to the energization of its tone relay for preventing operation of its message reproducing means, a selector on each vehicle governed by said tone relay and closing contacts only when said tone relay is intermittently energized in accordance with a particular code call allotted to that selector, and means operated by the closure of said selector contacts and maintained in operation only so long as said tone relay is energized for opening said muting circuit means and rendering said message reproducing means responsive to messages received independently of the energized condition of said tone relay.

8. In a communication system for providing selective communication from a central office to any one or all of a plurality of vehicles, a radio receiver on each vehicle, message reproducing means on each vehicle normally operated by the reception of a carrier signal modulated with a message by the associated radio receiver, tone responsive means connected to each radio receiver and energized only by an inaudible tone frequency for rendering the associated message reproducing means ineffective to respond to its radio receiver, a selector on each vehicle operated effectively only if said tone frequency is intermittently received in accordance with a particular code call allotted to that vehicle, and means actuated by the effective operation of said selector for rendering the associated message reproducing means effective to respond to its receiver independently of said tone responsive means, whereby interruption of said tone frequency in accordance with a code call for a particular vehicle renders effective the message reproducing means on that vehicle only and a message without said tone frequency is received by the message reproducing means on all vehicles.

9. In a communication system for providing selective communication to any one of a plurality of vehicles, a transmitter and a receiver on each vehicle, a loud-speaker on each vehicle normally operated from its receiver, electro-responsive means on each vehicle energized only by a distinctive signal accompanying a voice message for suppressing operation of the associated loud-speaker, a selector on each vehicle governed by its receiver and effectively operated only by a particular code call allotted to that vehicle, a manually operable talk switch on each vehicle for rendering its transmitter effective to send out a voice message accompanied by said distinctive signal, and means initially responsive to the operation of said selector or said talk switch for rendering said loud-speaker responsive to its receiver independently of the energization of said electro-responsive means, said means after such initial response being maintained in such condition so long as energization of said electro-responsive means continues.

10. In a communication system for providing selective communication between a central office and any one of a plurality of vehicles, a radio transmitter and receiver on each vehicle, a loud-speaker on each vehicle normally operated by voice messages superimposed upon a carrier frequency signal received by said radio receiver, electro-responsive means on each vehicle initially energized only by a distinctive signal preceding a voice message on a received carrier signal for suppressing operation of the associated loud-speaker, said electro-responsive means being maintained energized so long as said carrier signal continues, a selector on each vehicle governed by its radio receiver and effectively operated only by a particular code call allotted to that vehicle and made effective through the medium of said carrier signal, and control means on each vehicle initially responsive to the operation of its associated selector for rendering said loud-speaker responsive to its radio receiver regardless of the energized condition of said electro-responsive means, said control means after such initial response being maintained in such condition so long as said electro-responsive means continues to be energized.

11. In a communication system for providing selective communication from any one of a plurality of vehicles and a central office, radio transmitting and receiving means operating on the same carrier frequency at the central office and on each vehicle, a loud-speaker on each vehicle normally operated by messages received by its associated radio receiving means, manually operable means on each vehicle to render the associated radio transmitting means effective to transmit a radio message to the control office preceded by a distinctive controlling condition of the radio carrier frequency, relay means on each vehicle energized only by said distinctive controlling condition for suppressing operation of the associated loud-speaker and preventing operation of the associated manually operable means during the reception of the radio carrier frequency and for a limited time after its cessation, means on each vehicle responsive to the effective operation of its manually operable means and effective for a limited time for permitting operation of said loud-speaker independently of said relay suppressing means, and manually operable means at the central office effective only if no message is being received from a vehicle for rendering the central office radio transmitter effective to transmit said carrier frequency modulated by a voice message, whereby an acknowledgement from the central office of a call from any vehicle within a predetermined time is heard only by the vehicle calling.

12. In a communication system for providing selective communication between a central office and any one of a plurality of vehicles, radio transmitting and receiving means at the central office and on each vehicle adapted to operate on the same carrier frequency, message reproducing means on each vehicle normally effective to reproduce messages superimposed upon a carrier signal received by its associated radio receiving means, manually operable means on each vehicle for rendering the associated radio transmitting means effective to transmit a carrier signal with a superimposed message to the control office preceded by a distinctive controlling condition of the carrier signal, lockout means on each vehicle initially energized by the reception of said distinctive controlling condition for preventing operation of the associated message reproducing means and also for preventing operation of the associated manually operable means, said lockout means being maintained effective when once initially rendered effective during any reception of a radio carrier signal and for a limited time after its cessation, control means on each vehicle responsive to the effective operation of its manually operable means for rendering said message reproducing means effective regardless of the operated condition of the associated lockout means and for a limited time after each such transmission from that vehicle, said means being maintained effective throughout the reception of a carrier frequency signal if it is initially received within said limited time, and manually operable means at the central office effective to render its radio transmitting means effective at the central office only providing no carrier frequency signal is being received, whereby the transmission of a carrier frequency signal from the central office within a predetermined time following the reception of a call from any vehicle acts to establish selective communication with that vehicle alone.

13. In a communication system for providing selective communication between a central office and a plurality of movable vehicles, radio equipment including a transmitter and a receiver operating on the same carrier frequency at the central office and on each of the vehicles, message reproducing means on each vehicle normally operable to reproduce any message received by the associated radio receiver, selective calling means at the central office manually operable to transmit an inaudible tone frequency governed in accordance with any one of a plurality of distinctive code calls belonging to different vehicles, control means on each vehicle responsive to said tone frequency for rendering its message reproducing means ineffective, a selector on each vehicle effectively operated only in response to a particular code call allotted to that vehicle for rendering its message reproducing means effective independently of its associated control means, and manually operable means on each vehicle to render the associated radio transmitter active to send out a message to the central office accompanied by said tone frequency, whereby the operation of the message reproducing means on each vehicle is suppressed during transmission of messages to and from the central office accompanied by said tone frequency until the associated selector is operated by a code call belonging to that vehicle.

14. In a communication system for establishing communication between a fixed station and all or any selected one of a plurality of different vehicles, equipment for said fixed station including a radio transmitter and pulsing means normally acting while the communication system is not in use to operate said transmitter at recurrent intervals to provide spaced check pulses, said fixed station equipment including a source of inaudible tone frequency, two separate manually operable means at the fixed station, the actuation of either of said manually operable means rendering said transmitter effective to send out a sustained carrier frequency, the actuation of a particular one of said manually operable means also acting to modulate said carrier with said tone frequency, selector calling means at the fixed station manually operable to interrupt said tone frequency in accordance with any one of a plurality of distinctive code calls belonging to different vehicles, equipment on each vehicle including a radio receiver and message receiving means, means on each vehicle for maintaining said message receiving means inactive only while said check pulses or said tone frequency is being received, and a selector on each vehicle effectively operated only by tone frequency pulses of its particular code call for rendering said message receiving means active independently of the reception of said tone frequency.

15. In a communication system providing communication from a fixed station to all or a selected one of a plurality of movable vehicles, equipment on each vehicle including radio transmitting and receiving means operating on the same carrier frequency, said equipment being normally in condition to receive and being manually operable provided no carrier frequency is being received for transmitting a voice message to the fixed station, equipment at said fixed station including radio transmitting and receiving means operating on the same carrier frequency and controllable manually provided no carrier frequency is being received to transmit a carrier frequency to be modulated by a message with or without an inaudible tone frequency, said fixed station equipment including pulsing means for rendering the associated transmitter effective to send out check pulses at spaced intervals, said fixed station equipment also including selector calling means for governing said tone frequency in accordance with any one of a plurality of different code calls belonging to different vehicles, message receiving means on each vehicle operated from the associated radio receiving means, means on each vehicle for maintaining said message receiving means ineffective only if recurrent check pulses or said tone frequency is being received, and a selector on each vehicle effectively operated by the reception of its particular code call for rendering said message receiving means effective independently of the reception of said tone frequency.

16. In a communication system for providing communication from a fixed station to all or any selected one of a plurality of movable vehicles, radio transmitting means at the fixed station and radio receiving means on each vehicle normally cooperating while the system is not in use to maintain an electro-responsive device on each vehicle energized, means at the fixed station manually controllable by an operator for changing the normal transmission from said transmitter to deenergize said electro-responsive device on each vehicle and transmit a message with or without a distinctive inaudible calling tone frequency, manually operable selective calling means at the fixed station for governing said tone frequency in accordance with any selected one of a plurality of code calls belonging to different vehicles, a selector on each vehicle effectively operated only by the reception of the particular code allotted to that vehicle, receiving means on each vehicle for receiving a message from the fixed station, and control means on each vehicle tending to assume its active condition and render said receiving means effective to receive, and for maintaining said control means inactive under normal conditions by the energization of the associated electro-responsive device and also by the reception of said tone frequency unless the associated selector has been effectively operated by the transmission of the code call belonging to that vehicle.

17. In a system for providing communication between a fixed station and all or any selected one of a plurality of mobile units, a radio receiver on each mobile unit including a carrier operated relay and a tone relay responsive to a particular inaudible tone on said carrier frequency, message receiving means on each mobile unit, means on each mobile unit effective only if said carrier relay is intermittently energized or said tone relay is energized for maintaining said message receiving means inactive, and a selector responsive to the intermittent operation of said tone relay in accordance with a particular code call allotted to that mobile unit for rendering said message receiving means effective independently of the reception of said tone frequency, whereby control of said tone frequency in accordance with a particular code call followed by the sustained tone frequency renders effective the message receiving means on the particular mobile unit being called only, and whereby a sustained carrier frequency without any tone frequency renders the message receiving means effective on all the mobile units.

18. In a communication system for providing selective communication to and from a central office and any one of a plurality of vehicles, radio transmitting and receiving means at the central office and on each vehicle, message reproducing means on each vehicle normally operating in response to a message received by the associated radio receiving means, an electro-responsive device on each vehicle energized only by an inaudible tone frequency on the radio carrier frequency for suppressing operation of the associated message reproducing means, manually controlled means in the central office for rendering its transmitter effective to transmit a message with or without said tone frequency intermittently applied for a time in accordance with any one of a plurality of code calls allotted to the different vehicles, a selector on each vehicle effectively operated only by the reception of said tone frequency forming its code call for rendering its message reproducing means effective independently of the energization of its electro-responsive device, a manually operable talk switch on each vehicle effective only if said electro-responsive device has been deenergized for a predetermined time but may be made immediately effective if said selector has been effectively operated for rendering the associated transmitting means active for sending out a message for the central office accompanied by said tone frequency, whereby two-way communication without interruption exceeding a predetermined time may be carried on between the central office and the one particular vehicle alone which has called the central office or has been selectively called from the central office.

19. In a communication system for providing selective communication between any one of a plurality of vehicles and a central office, a radio transmitter and receiver operating on the same carrier frequency at the central office and on each vehicle, means at the central office manually operable only if no radio signal is then being received for rendering the transmitter at the central office effective to transmit a message accompanied by an inaudible tone frequency, and equipment on each vehicle comprising message receiving means, a tone relay energized only if said tone frequency is being received, manually controlled means for rendering the vehicle transmitter effective to transmit a message to the control office accompanied by said tone frequency, suppressing means responsive to the energization of said tone relay and acting for a limited time after its deenergization to prevent operation of said manually controlled means and also to render said message receiving means ineffective, and means responsive to the operation of said manually controlled means on the vehicle for rendering said message receiving means effective for a limited time independently of said suppressing means, whereby a vehicle calling the central office suppresses the message receiving means on other vehicles during such communication and for a limited time thereafter and also renders its own message receiving means responsive for such a limited time, so that an acknowledgement of the call from the central office within such limited time reaches the calling vehicle only.

20. In a communication system for providing selective communication between a central office and a plurality of movable vehicles, a radio transmitter and receiver at the central office and on each of the vehicles all being operable on the same carrier frequency, a loud-speaker at the office and on each vehicle operable to reproduce any message received by the associated radio receiver, selective calling means at the central office manually operable to transmit an inaudible tone frequency governed in accordance with any one of a plurality of distinctive code calls belonging to the different vehicles and thereafter allowing a steady transmission of such inaudible tone frequency, an indicator lamp at the central office for indicating the termination of the distinctive code call to indicate when a voice message may be transmitted, control means on each vehicle responsive to a steady tone frequency for rendering its loud-speaker ineffective but responsive to a code call allotted to that vehicle for rendering its loud-speaker effective regardless of the continued steady transmission of such tone frequency, said means remaining effective for a predetermined time following each reception, manually operable means on each vehicle for rendering the associated radio transmitter active to send out a message to the central office accompanied by said tone frequency, said means acting upon its associated control means if operated within said limited time to maintain its associated loud-speaker effective and for a limited time following such transmission from that vehicle, indicator means at the office and at each vehicle indicating when a carrier frequency signal is being received by its associated radio receiver, and a clear-out indicator at the office and at each vehicle governed by the associated radio receiver and manually operable means to indicate when transmission is in progress in either direction and to give the same indication for said predetermined time following each such transmission.

21. In a radio communication system for providing selective communication between a central office and any one of a plurality of secondary stations, a radio transmitter at said central office and a radio receiver at each of said secondary stations all being operable on the same carrier frequency, a facsimile transmitter at said central office and a facsimile receiver at each of said secondary stations, manually operable means at the central office for rendering its radio transmitter active to radiate a carrier frequency signal for at times transmitting a distinctive controlling condition and a selecting code followed by a facsimile message and for at other times transmitting a facsimile message alone, control circuit means at each secondary station for rendering the facsimile receiver at that station effective upon the reception of a carrier signal for reproducing any facsimile message received, suppressing means at each secondary station rendered active by its associated radio receiver in response to the reception of said distinctive controlling condition for acting upon said control circuit means to prevent the operation of the associated facsimile receiver, and code responsive means at each secondary station governed by its associated radio receiver and effectively operated only upon the reception of a code call allotted to that station for rendering its facsimile receiver effective regardless of the active condition of said suppressing means for that station, whereby transmission of the distinctive controlling condition and a selecting code for a desired station effects exclusive facsimile communication with a desired secondary station while transmission of a facsimile message without the distinctive controlling condition and selecting code effects facsimile communication with all secondary stations.

22. In a system for providing radio communication between a fixed station and any selected one or all of a plurality of mobile stations, a radio receiver at each mobile station including a carrier operated relay and a tone relay responsive to a particular inaudible tone on said carrier frequency, message reproducing means on each mobile unit, means on each mobile unit effective only if said carrier relay is intermittently energized or said tone relay is energized for maintaining said message reproducing means inactive, a selector responsive to the operation of said tone relay in accordance with a particular code call allotted to that mobile station for rendering said message reproducing means effective regardless of the reception of said tone freouency, a check indicator lamp at each mobile station energized so long as said carrier operated relay is intermittently operated or said tone responsive relay is energized unless said selector is operated to select that station, whereby the control of said tone frequency in accordance with a particular code call followed by the sustained tone frequency renders effective the message receiving means on only a particular mobile unit and at the same time extinguishes the check lamp at that mobile station only, and whereby a sustained carrier frequency without any tone frequency renders the message receiving means effective on all the mobile stations and at the same time extinguishes the check lamps at all such stations.

23. In a system for providing selective intercommunication between a central station and a plurality of other stations, a radio transmitter and receiver at each station adapted to operate on signals of the same carrier frequency, manually operable means at each station normally rendering active the receiver at the station but being manually operable to render the associated transmitter active and the receiver inactive providing no carrier signal is then being received, a loud speaker at each station normally effective to reproduce voice messages accompanying a carrier frequency signal, control means associated with each station except said central station for causing a distinctive control condition to be transmitted through the medium of the carrier frequency signal from that station upon the initial operation of said associated manually operable means, and suppression circuit means at each station except said central station responsive to the reception of a carrier signal accompanied by said distinctive control condition for rendering the associated loud speaker ineffective to reproduce a voice message, whereby a message can be transmitted from said central station to all other stations upon the actuation of its said manually operable means but a message transmitted from any particular station upon the actuation of its said manually operable means can be received only by said central station since said suppression means is rendered effective at each of the other stations.

24. In a system for providing selective intercommunication between a central station and a plurality of different outlying stations, a radio transmitter and receiver at each station adapted to operate on signals of the same carrier frequency, manually operable means at each of said stations normally biased to render the receiver active at that station but being manually operable to an active position to render the associated transmitter active for transmitting voice messages and the associated receiver inactive only providing no carrier signal is then being received, a voice reproducer associated with the receiver at each station and normally effective to reproduce voice messages accompanying a carrier frequency signal received at that station, control means associated with each of said stations except said central station for momentarily interrupting the carrier signal being transmitted from that station upon the initial actuation of the associated manually operable means, and disabling circuit means at each station except said central station responsive to the momentary interruption of a carrier signal then being received for thereafter rendering the associated voice reproducer ineffective so long as a carrier signal continues to be received, whereby a message can be transmitted from said central station to all of the other stations by actuation of its manually operable means providing a message is not then being received from some station, and whereby any of the other stations can selectively communicate with the central station alone a short time following the actuation of its manually operable means.

25. In a system for providing selective intercommunication between a central station and a plurality of other stations, a radio transmitter and receiver at each station adapted to operate on signals of the same carrier frequency, manually operable means at each of said stations normally rendering the receiver active at that station but capable of being operated to render the receiver inactive and the associated transmitter active provided no carrier signal is then being received, a voice reproducer associated with the receiver at each station and normally effective to reproduce voice messages accompanying a carrier frequency signal received at that station, circuit means at each of said stations except said central station governed by said manually operable means at that station a short interval after its actuation for only momentarily interrupting the carrier signal then being transmitted from that station, an indicator lamp controlled by said circuit means to give a distinctive indication following said momentary interruption of the carrier signal to thereby advise the operator when said transmitter at that station is available for transmitting a voice message, and disabling circuit means at each station except said central station responsive to the momentary interruption of a carrier signal then being received by the associated receiver for thereafter rendering the associated reproducer ineffective dependent upon the continued reception of that carrier signal, whereby each station can initiate communication with the central station to the exclusion of the remaining stations although the central station can initiate communication with all of the stations.

26. In a system for providing selective intercommunication between a central station and a plurality of other stations, a radio transmitter and receiver at each station adapted to operate on signals of the same carrier frequency, said receiver at each station being normally active for the reception of carrier signals, manually operable circuit means at each station capable of being actuated to render the associated receiver inactive and the transmitter active only providing such receiver is not then receiving a carrier signal, a voice reproducer associated with the receiver at each station and normally effective to reproduce any voice messages superimposed upon the carrier signal then being received, code transmitting means at the central station responsive to manual actuation for interrupting the carrier signal then being transmitted in accordance with a selected code call and thereafter permitting steady transmission of the carrier signal subject to said manually operable circuit means, timing circuit means at each of said stations except said central station responsive to the actuation of said manually operable circuit means at that station a short interval after its actuation for momentarily interrupting the carrier signal then being transmitted from that station, disabling circuit means at each station except said central station responsive to the momentary interruption of a carrier signal then being received for thereafter rendering the associated reproducer ineffective dependent upon the continued reception of that carrier signal, and a selector device at each station except the central station responsive to the interruption of a received carrier signal in accordance with a particular code call for rendering the disabling circuit means ineffective at that station, whereby said central station can communicate with any selected station or all stations as desired, and each of the other stations can communicate with said central station to the exclusion of the remaining stations.

27. In a system for providing selective intercommunication between a central station and a plurality of other stations, a radio transmitter and receiver at each station adapted to respectively transmit and receive signals of the same carrier frequency, manually operable means at each of said stations normally rendering active the receiver at that station but being operable to render the receiver inactive and the associated transmitter active provided no carrier signal is then being received, a loud speaker at each station normally effective to reproduce voice messages accompanying a carrier signal, circuit means at each station except said central station responsive to the operation of its associated manually operable means to initiate transmission for momentarily interrupting the carrier signal then being transmitted from that station, suppression circuit means at each station except said central station responsive to the reception of a carrier signal momentarily interrupted for thereafter rendering the associated loud speaker ineffective to reproduce voice messages so long as a carrier signal continues to be received and for a predetermined time after its cessation, whereby a message can be transmitted from said central station to all of the other stations upon actuation of its manually operable means but can selectively communicate with that particular station from which it has just received a message if it initiates transmission within said predetermined time.

28. In a system for providing selective intercommunication between a central station and a plurality of other stations, a radio transmitter and receiver at each station adapted to respectively transmit and receive signals of the same carrier frequency, manually operable means at each of said stations normally rendering active the receiver at that station but being operable to render the receiver inactive and the associated transmitter active providing no carrier signal is then being received, a loud speaker associated with the receiver at each station normally effective to reproduce voice messages accompanying a carrier signal, circuit means at each station except said central station responsive to the operation of its associated manually operable means to initiate transmission for momentarily interrupting the carrier signal then being transmitted from that station, suppression circuit means at each station except said central station responsive to the reception of a carrier signal momentarily interrupted for thereafter rendering the associated loud speaker ineffective to reproduce voice messages so long as a carrier signal continues to be received and for a predetermined time after its cessation, a clearout relay at the central station rendered active whenever that station transmits or receives a carrier signal and remaining active for a predetermined time following such operations, and an indicator lamp controlled by said clear-out relay to give a distinctive indication when that relay is active to thereby advise the operator as to whether the initiation of transmission from that station will effect communication with a particular station or all stations, whereby a message can be transmitted from said central station to all of the other stations upon actuation of its manually operable means but can selectively communicate with that particular station from which it has just received a message if it initiates transmission within said predetermined time.

29. In a system for providing selective intercommunication between a central station and a plurality of other stations, a radio transmitter and receiver at each station, manually operable means at each station normally allowing the associated receiver to be active but operable to render the associated transmitter active and the receiver inactive only if such receiver is not then receiving a carrier signal, a reproducer at each station normally effective to reproduce voice messages modulating a received carrier signal, control circuit means associated with each station except said central station for causing a distinctive control condition to be transmitted through the medium of the carrier signal transmitted from that station upon the initial operation of its associated manually operable means, suppression circuit means at each station except said central station responsive to the reception of said distinctive control condition for rendering the associated reproducer ineffective, and other manually operable means at each station except the central station for rendering the associated receiver inactive and the associated transmitter active only if such receiver is not then receiving a carrier signal, but being effective upon its actuation to render the transmitter active without causing the response of the associated control circuit means, whereby the central station can initiate communication with all of the stations when desired, and each of the other stations can initiate communication with the central station alone or with all other stations as desired.

NEIL D. PRESTON.
FOREST B. HITCHCOCK.

REFERENCES CITED

The following references are of record in the file of this patent:

UNITED STATES PATENTS

| Number | Name | Date |
|---|---|---|
| 1,485,773 | Espenschied | Mar. 4, 1924 |
| 1,624,672 | O'Neill | Apr. 12, 1927 |
| 2,040,462 | Bown | May 12, 1936 |
| 2,040,471 | Coxhead | May 12, 1936 |
| 2,061,699 | Fox | Nov. 24, 1936 |
| 2,064,958 | Taylor | Dec. 22, 1936 |
| 2,125,953 | Prochnow | Aug. 9, 1938 |
| 2,176,868 | Boswau | Oct. 24, 1939 |
| 2,265,056 | Bowers | Dec. 2, 1941 |
| 2,399,738 | Howe | May 7, 1946 |
| 2,407,846 | O'Brien | Sept. 17, 1946 |